US008479146B2

(12) United States Patent  (10) Patent No.: US 8,479,146 B2
Thornton et al.  (45) Date of Patent: Jul. 2, 2013

(54) UTILITY COMPUTING SYSTEM HAVING CO-LOCATED COMPUTER SYSTEMS FOR PROVISION OF COMPUTING RESOURCES

(75) Inventors: Barry W. Thornton, Austin, TX (US); Syed Mohammad Amir Husain, Austin, TX (US)

(73) Assignee: ClearCube Technology, Inc., Austin, TX (US)

( * ) Notice: Subject to any disclaimer, the term of this patent is extended or adjusted under 35 U.S.C. 154(b) by 1703 days.

(21) Appl. No.: 11/534,545

(22) Filed: Sep. 22, 2006

(65) Prior Publication Data

US 2007/0074174 A1  Mar. 29, 2007

Related U.S. Application Data

(60) Provisional application No. 60/720,295, filed on Sep. 23, 2005.

(51) Int. Cl.
*G06F 9/44* (2006.01)
*G06F 15/173* (2006.01)

(52) U.S. Cl.
USPC .......................................... 717/103; 709/226

(58) Field of Classification Search
None
See application file for complete search history.

(56) References Cited

U.S. PATENT DOCUMENTS

| 6,012,101 | A | * | 1/2000 | Heller et al. | 709/250 |
| 6,038,616 | A | * | 3/2000 | Thornton et al. | 710/2 |
| 6,119,146 | A | * | 9/2000 | Heller et al. | 709/203 |
| 7,069,368 | B2 | * | 6/2006 | Thornton | 710/301 |
| 7,331,034 | B2 | * | 2/2008 | Anderson | 717/103 |
| 7,499,968 | B1 | * | 3/2009 | Alexander et al. | 709/203 |
| 2001/0000539 | A1 | * | 4/2001 | Heller et al. | 710/62 |
| 2002/0091850 | A1 | * | 7/2002 | Perholtz et al. | 709/231 |
| 2002/0152305 | A1 | * | 10/2002 | Jackson et al. | 709/224 |
| 2004/0015820 | A1 | * | 1/2004 | Balassanian | 717/103 |

(Continued)

OTHER PUBLICATIONS

Talwar, V., et al., "Architecture for Resource Allocation Services Supporting Interactive Remote Desktop Sessions in Utility Grids," $2^{nd}$ Workshop on Middleware for Grid Computing [online], 2004 [retrieved Feb. 21, 2013], Retrieved from Internet: <http://monetweb.cs.illinois.edu/publications/papers/vtalwar-mgc04.pdf>, pp. 23-28.*

(Continued)

*Primary Examiner* — Don Wong
*Assistant Examiner* — Todd Aguilera
(74) *Attorney, Agent, or Firm* — Meyertons Hood Kivlin Kowert & Goetzel, P.C.; Jeffrey C. Hood; Mark S. Williams

(57) ABSTRACT

System and method for providing computer resources to users. The system includes a plurality of co-located computing systems, e.g., blade computers, comprising a hierarchy of computer resources based on performance, and located at a first location, each computing system including a processor, a memory medium coupled to the processor, and a plurality of human interface systems, each located at a second location remote from the first location, and each including an interface device, and one or more human interface devices coupled to the interface device, where each human interface system is coupled to the co-located computing systems over a network, such as a LAN or a WAN, via the interface device. Computer resources are provided to users of the plurality of remote human interface systems over the network in accordance with the computer resource performance needs of the users. Charges may be assessed for usage of the computer resources.

34 Claims, 10 Drawing Sheets

U.S. PATENT DOCUMENTS

| | | | |
|---|---|---|---|
| 2004/0088410 A1* | 5/2004 | Flynn et al. | 709/225 |
| 2004/0093583 A1* | 5/2004 | McAnaney et al. | 717/103 |
| 2004/0098458 A1* | 5/2004 | Husain et al. | 709/204 |
| 2004/0225794 A1* | 11/2004 | Thornton | 710/301 |
| 2005/0188088 A1* | 8/2005 | Fellenstein et al. | 709/226 |
| 2005/0193259 A1* | 9/2005 | Martinez et al. | 714/34 |
| 2006/0031448 A1* | 2/2006 | Chu et al. | 709/223 |
| 2006/0053215 A1* | 3/2006 | Sharma | 709/223 |
| 2006/0155555 A1* | 7/2006 | Barsness et al. | 705/1 |
| 2006/0212334 A1 | 9/2006 | Jackson | |
| 2006/0218285 A1 | 9/2006 | Talwar et al. | |
| 2006/0230149 A1 | 10/2006 | Jackson | |

OTHER PUBLICATIONS

Anonymous, "Briefing: Utility Computing," Information Professional [online], 2005 [retrieved 2013-2-21], Retrieved from Internet: <http://ieeexplore.ieee.org/stamp/stamp.jsp?tp=&arnumber=5308524>, pp. 20-27.*

* cited by examiner

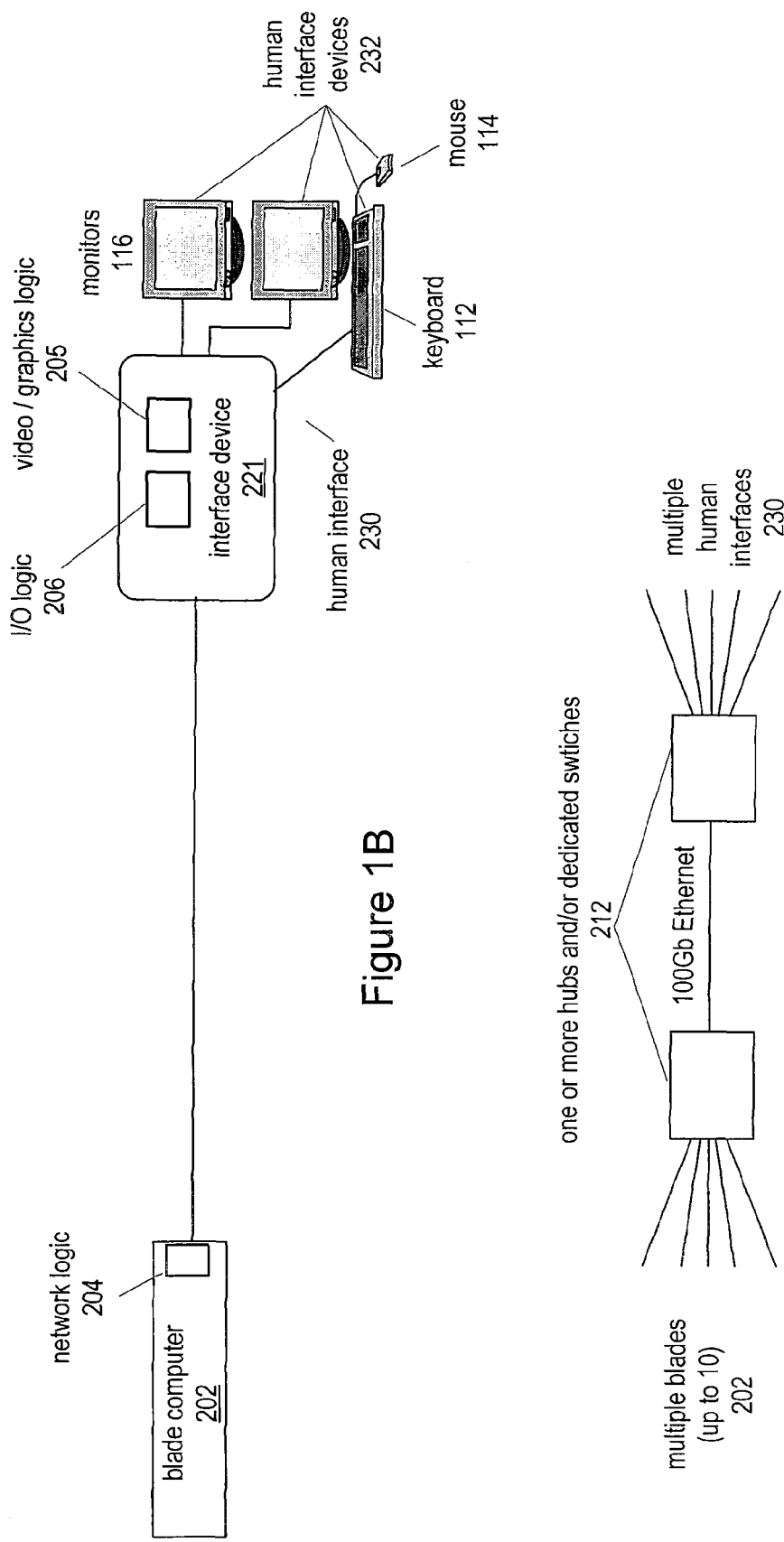

UTILITY COMPUTING SYSTEM HAVING CO-LOCATED COMPUTER SYSTEMS FOR PROVISION OF COMPUTING RESOURCES

PRIORITY CLAIM

This application claims benefit of priority of provisional application Ser. No. 60/720,295 titled "Distributed Computing System", filed Sep. 23, 2005, whose inventor is Barry W. Thornton.

BACKGROUND OF THE INVENTION

1. Field of the Invention

The present invention relates generally to providing computer resources, and more particularly to the remote provision of such resources to users.

2. Description of the Related Art

The components of a computer system (such as PCs, mini-computers and mainframes), may be divided into two functional units—the computing system and the human interface (or "HI") to the computing system. For a PC, the computing system may be the processor (i.e., CPU), dynamic random access memory, non-volatile memory, power supply and similar components. The computing system may be included in a chassis that holds the motherboard, power supply, memory and the like. The human interface, on the other hand, may include those devices that humans use to transfer information to and/or receive information from the computing system. The most commonly recognized devices which form part of the human interface to the computing system include the display, keyboard, mouse and printer. The human interface may include a variety of other devices, such as a joystick, trackball, touchpad, microphone, speakers, and telephone, as well as other devices too numerous to specifically mention.

In current computer systems, e.g., current PC architectures, the human interface (e.g., the display monitor, mouse, and keyboard, etc.) is closely located to the computer system, by a distance typically less than about 10 feet. The computing system generates and/or receives human interface signals, e.g., display monitor, mouse and keyboard formatted data, that are provided directly to/from the human interface or desktop via individual specialized cables, or by wireless means. For example, for most PCs installed at workstations, the computer display, keyboard and mouse rest on the desktop while the computer chassis which holds the computing system rests on the floor underneath the desktop. As is well known, two or more computing systems may be connected together in a network configuration.

While the above-described network configuration is quite common in many business establishments, recently, a number of issues, in particular, security concerns, have been raised in connection with such network designs. Business contacts, vendor information, contracts, reports, compilations, proprietary software, access codes, protocols, correspondence, account records, and business plans are just some of the fundamental assets of a company which are oftentimes accessible from an employee's computer where they can be quickly copied onto a floppy disk and stolen.

Disk and CD drives may also be used to introduce illegal, inappropriate or dangerous software to a computer. Storing bootlegged software can expose a company to copyright infringement claims. Computer games often reduce employee productivity. If imported onto a computer system, computer pornography may create a hostile work environment that leads to a sexual discrimination lawsuit against the company. Computer viruses can cause the loss of critical information stored on a computer. Finally, the computing system itself may be damaged or otherwise misconfigured when left accessible to technically oriented employees who take it upon themselves to attempt to repair and/or modify the computer system.

Another concern often raised in connection with the present practice of placing the computer system at the desktop is that such workstation designs actual work against proper maintenance of the computing system. When placed underneath the desktop, computing systems are often forced to absorb physical shocks when accidentally kicked, knocked over or struck by falling objects, any of which could result in damage to the various electronic components located within the chassis. Oftentimes, a computing system is placed in a "convenient" location and not in a location designed to keep it cool. A computer system typically includes a cyclonic fan designed to direct a constant flow of cooling area at the heat-generating components of the computing system. However, if a barrier is placed a few inches in front of the fan intake, the efficiency of the fan is reduced dramatically. Similarly, placing the computer system against a wall or running cables in front of the fan adversely affects the ability of the fan to properly cool the computing system. Finally, even in relatively clean office environments, the fan tends to draw in dirt and other dust particles into the interior of the computer chassis where they are deposited on the heat-generating electronic components which include the computing system. As dust tends to collect on and insulate the components on which it is deposited, the ability of such components to dissipate heat becomes degraded.

Logistical support, too, becomes a vexing problem for computer-intensive organizations when computing systems are scattered throughout a facility. When machine failures occur, the repair person must go to the machine to diagnose and repair the machine. Oftentimes, this entails multiple visits to the machine's location, particularly when the first examination reveals that replacement parts or a replacement machine are needed. Similarly, software upgrades and other performance checks become quite time-consuming tasks when personnel must travel to each machine where the software resides locally.

Finally, many office buildings were designed before the advent of the age of the PC. As a single PC can consume over 300 watts of power, a heavily computerized workplace could potentially demand power in excess of the amount available. Similarly, the heat generated by the large number of computers installed in modern workplaces can easily overwhelm the air conditioning capacity of a building's HVAC system, thereby causing room temperatures to rise above those levels preferred by the occupants of the building.

These concerns have been driving the development of the network computer (or "NC") and other so-called "thin" computer solutions. While various NC designs have been proposed, most entail removal of the auxiliary memory (also known as the hard drive) and substantially reducing the size of the processor. Most NC designs propose that all software applications and data files be stored on the network and the NC be limited to accesses of network software and data files. Most NC designs also propose that all disk drives (typically, the CD and floppy drives) be removed, thereby eliminating the ability of the NC user to import or export software applications and/or data files.

The development of the NC is in part due to a recognition by the computer industry of security and other problems which have arisen due to the evolution of computer networks into their present configuration. However, the NC is not a fully satisfactory solution to these problems. While removing much of the processing capability from the workstation, most NC designs propose leaving sufficient intelligence (including a processor and memory) at the workstation to access the Internet, e.g., by executing web browser software, load software applications retrieved from the network memory, and perform other operations. Thus, while reduced in complexity, NCs will still have maintenance, power and cooling concerns. Thus, while the NC represents a step in the right direction, many of the aforementioned issues cannot be resolved by wide-scale implementation of NCs.

In order to fully resolve the aforementioned issues, in some current systems the entire computing system is physically separated from the human interface, specifically, by keeping the human interface (display, keyboard, mouse and printer) at the desktop or workstation while relocating the associated computing system (e.g., motherboard, power supply, memory, disk drives, etc.) to a secured computer room where plural computing systems are maintained. By securing the computing systems in one room, the employer's control over the computer systems is greatly enhanced. For example, since employees no longer have personal access, through the floppy or CD drive, to the memory subsystem, employees can not surreptitiously remove information from their computing system in this manner. Nor can the employee independently load software or other data files onto their computing system. Similarly, the employee can no longer physically change settings or otherwise modify the hardware portion of the computer. Maintenance is also greatly facilitated by placement of all of the computing systems in a common room. For example, the repair technicians and their equipment can be stationed in the same room with all of the computing systems. Thus, a technician could replace failed components or even swap out the entire unit without making repeated trips to the location of the malfunctioning machine. Such a room can be provided with special HVAC and power systems to ensure that the room is kept clean, cool and fully powered.

U.S. Pat. No. 6,012,101 titled "Computer Network Having Commonly Located Computer Systems"; U.S. Pat. No. 6,119,146 titled "Computer Network Having Multiple Remotely Located Human Interfaces Sharing a Common Computing System"; U.S. Pat. No. 6,038,616 titled "Computer System With Remotely Located Interface Where Signals are Encoded at the Computer System, Transferred Through a 4-wire Cable, and Decoded at the Interface" disclose systems where a plurality of computing systems are located at one location, and the human interfaces associated with these computing systems are remotely located at respective desktops.

However, these systems rely on conversion of digital I/O signals to analog signals for transmission between the computing system and the human interface (and the corollary conversion back to digital I/O signals upon reception), which may significantly limit transmission distances, and may require complicated digital/analog signal manipulation with commensurate hardware complexity.

Another issue not addressed by prior art systems is the fact that most computers are typically not run at full capacity. In other words, the vast majority of computer systems remain idle for a great deal, if not most, of their operative lives. For example, typical tasks such as word processing, email, and web browsing generally use only a fraction of the system's processing and storage capabilities. Generally, a user's computer system is geared for peak usage for that user, i.e., is equipped or configured to meet the demands of the user's most intensive applications. For all those times that the user is not running these intensive applications, the system is likely to be substantially underused. Thus, a large portion, if not all, of a company's information technology (IT) resources are under utilized, resulting in wasted expenses, and inefficient usage of computational resources and computing services Therefore, improved systems and methods are desired for providing computational resources and computing services to users.

SUMMARY OF THE INVENTION

The present invention comprises various embodiments of a system for providing computational resources and computing services, e.g., to a home or office.

The system includes a plurality of computer systems, including, for example, a plurality of co-located computing systems located at a first location. Each of the computing systems may include: a processor, a memory medium coupled to the processor, including a dynamic memory and a non-volatile memory, one or more buses, network interface logic, and other computer system components. The computing system may also optionally include video/graphics logic for generating or rendering image data to refresh a display, e.g., for generating pixel data in a frame buffer.

The system may also include a plurality of human interface systems. Each respective human interface system may be located remotely from the first location and coupled to one or more of the computing systems over a transmission medium or network. The respective human interface systems may be located at different locations, e.g., in various offices, cubicles, homes, etc. Each human interface system may include an interface device and one or more human interface devices coupled to the interface device. The interface device may comprise network logic or other interface logic for interfacing to the transmission medium or network, and human interface logic. The human interface logic may comprise graphics logic for receiving image or pixel data, assembling an image, and presenting the image on a display. The human interface logic may also comprise logic for providing other received human interface signals to/from the other respective human interface devices, such as a mouse, keyboard, speakers, etc.

In some embodiments, each computing system may include a chassis, where the processor, the memory medium, and the power supply (and possibly video/graphics and network logic) are included in the chassis. However, in preferred embodiments, each of the plurality of computing systems comprises a blade computer. For example, each computing system may include a circuit card, where the processor, the memory medium, and the power supply (and preferably, the video/graphics and network logic) are included on the circuit card. Each computing system may comprise a client computer system operable to provide computational resources to one or more users of the human interface systems.

In one embodiment, at least one of the human interface systems may include an additional interface device and one or more additional human interface devices coupled to the additional interface device, where, for example, the additional interface device is daisy chained from the interface device.

In preferred embodiments, for at least a subset of the plurality of computing systems and human interface systems, the network logic and the interface device are operable to exchange human interface signals through transmission of packetized data over the network.

In some embodiments, the interface device includes a programmable hardware element configured to perform multiple operations, e.g., to implement multiple (e.g., dual) process functionality via a small kernel operating system executable by the programmable hardware element. To implement the multiple process functionality, the programmable hardware element may be configured to process and provide video signals for display on a monitor, and process non-video I/O signals for one or more non-video human interface devices, as described above.

In other embodiments, the interface device includes an application specific integrated circuit (ASIC) configured to implement multiple process functionality. To implement the multiple process functionality, the ASIC may be configured to process and provide the video signals for display on a monitor, and process the non-video I/O signals for one or more non-video human interface devices.

In some embodiments, the data transmitted from the computing system to the human interface system may be compressed, e.g., via any type of compression scheme desired, including for example, run-length encoding, MPEG-4, or other more sophisticated techniques. Thus, in some embodiments, the interface device may be operable to decompress video signals for display on a monitor (and optionally, to decompress non-video I/O signals). In preferred embodiments, the interface device may also be operable to support USB 2 communications, and/or route communications traffic between the computing system and the human interface devices.

It should be noted that in preferred embodiments, the remote human interfaces (i.e., the remote human interface systems, are not capable of general-purpose computer functionality. In other words, the interface devices are not general-purpose computer systems, but rather, rely on the co-located computing systems for computer resources. Thus the interface devices may exclusively or primarily provide capabilities to enable the computing system and human interface devices to interface to each other.

Note that in some embodiments, various portions of the functionality described above may be performed in hardware, software, or combinations of the two. For example, in one embodiment, video/graphics data generated by the video/graphics logic in the computing system may be packetized and otherwise processed by software, e.g., instead of this functionality being performed by the network logic.

The plurality of co-located computing systems may couple to the plurality of human interface systems over a network, e.g., a local area network (LAN) or a wide area network (WAN), such as the Internet. In some embodiments, each of the computing systems may be associated with or used by one or more human interface systems (i.e., respective users of the human interface systems), and/or each human interface system (i.e., user of the human interface system) may use or be associated with one or more of the co-located computing systems.

In some embodiments, the techniques described herein may be used to implement a utility computing scheme, where computer resources are provided to users on an "as needed" and/or pay for use basis. For example, in some embodiments a plurality of co-located computing systems may be established at a first location. The plurality of co-located computing systems may comprise a hierarchy of computer resources based on performance, cost and/or other metrics. A plurality of remote human interface systems may be established at different respective second locations, where the second locations are remote from the first location, and where the plurality of remote human interface systems are coupled to the plurality of co-located computing systems over a wide area network (WAN), e.g., the Internet. Computer resources may be provided to users of the plurality of remote human interface systems in accordance with the computer resource performance needs of the users, and charges assess or determined based on the usage of the computer resources. The users or representatives of the users may provide payment in response to the charges.

For example, in one embodiment, computer resource usage by the users may be monitored, e.g., based on one or more of usage time, processor time, processing cycles, bandwidth used, etc. and charges for the computer resource usage determined based on the monitoring. In various embodiments, the charges may be determined per user, or per group of users. In some embodiments, the providing and charging may be performed in accordance with a subscription agreement with the users or their representatives, and/or a metered use agreement with the users or their representatives. In some embodiments, computer resource usage by the users may be monitored, and resource usage analyzed based on the monitoring, where results of the analyzing are useable in managing the computer resources and/or usage of the computer resources.

The computer resources may include computational resources, and/or software programs. The performance of the computer resources may include one or more of: hardware computation capacity, hardware memory capacity, communication bandwidth, software application cost, software application computational demands, and operating system attributes.

In some embodiments, providing computer resources and charging for usage of the computer resources may be performed on a task basis, where a task includes a specified use of one or more computer resources. Additionally, auxiliary services may be provided to a user, where the auxiliary services may include task support for a user, debugging services for a user, network bandwidth, telephone services, television services, etc., where the user or a representative may be charged for the auxiliary services.

In a preferred embodiment, a first entity, e.g., a first business or organization, may provide the computer resources (for charge) to one or more second entities, e.g., second businesses or organizations.

A graphical user interface (GUI) may be provided to one or more users or their representatives, where the GUI presents computer resource provision agreement options. Input may be received to the GUI selecting one or more of the computer resource provision agreement options, where providing resources and charging are performed in accordance with the selected computer resource provision agreement options.

Similarly, a graphical user interface (GUI) may be provided to one or more users or their representatives, where the GUI presents available computer resources. Input to the GUI may be received requesting use of one or more of the computer resources, where providing resources and charging are performed in accordance with the requested computer resources. In some embodiments, the available computer resources may be presented in terms of tasks, where requesting use of one or more of the computer resources includes requesting performance of at least one task. In some embodiments, the charges for resources provided are based on the performance of the computer resources used.

In some embodiments, rather than providing resources over a WAN to other entities, an entity may provide resources to employees, members, or associates of the entity over a LAN.

Thus, various embodiments of the present invention may provide means for providing computational resources and computer services.

BRIEF DESCRIPTION OF THE DRAWINGS

Other advantages and details of the invention will become apparent upon reading the following detailed description and upon reference to the accompanying drawings in which:

FIGS. 1A-1C illustrate embodiments of a computer system with a remote human interface;

Figure 1A:
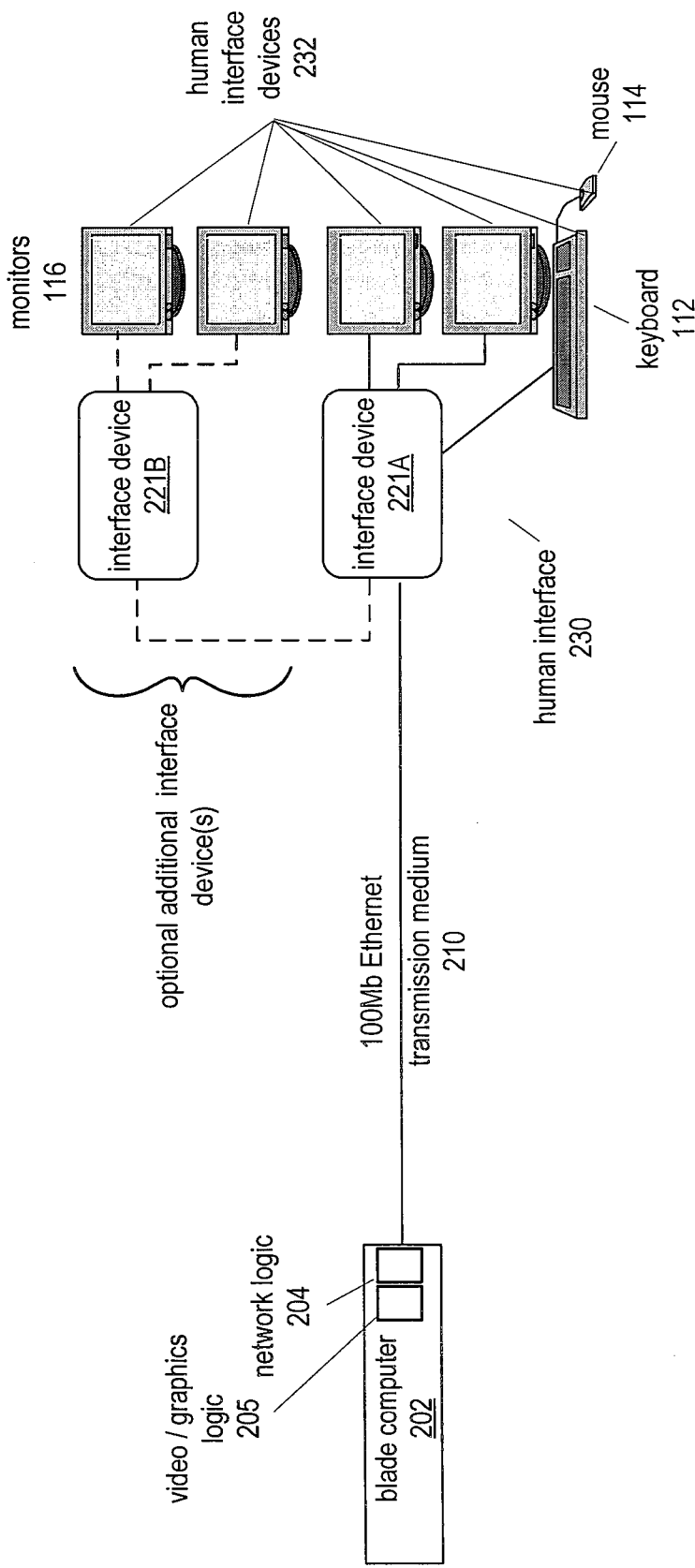

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Incorporation by Reference

The following patents and publications are hereby incorporated by reference in their entirety as though fully and completely set forth herein.

U.S. Pat. No. 6,119,146 titled "Computer Network Having Multiple Remotely Located Human Interfaces Sharing A Common Computing System", which was filed May 4, 1998, whose inventors are Barry Thornton, Andrew Heller, Daniel Barrett, and Charles Ely.

U.S. Pat. No. 6,038,616 titled "Computer System With Remotely Located Interface Where Signals Are Encoded At The Computer System, Transferred Through A 4-Wire Cable, And Decoded At The Interface", which was filed May 4, 1998, whose inventors are Barry Thornton, Andrew Heller, Daniel Barrett, and Charles Ely.

U.S. Pat. No. 6,012,101 titled "Computer Network Having Commonly Located Computing Systems", which was filed May 4, 1998, whose inventors are Andrew Heller, Barry Thornton, Daniel Barrett, and Charles Ely.

U.S. patent application Ser. No. 10/032,325 titled "System And Method For Remote Monitoring And Operation Of Personal Computers", which was filed Dec. 31, 2001, whose inventors are Ronald J. Perholtz and Eric J. Elmquest.

U.S. patent application Ser. No. 09/728,667 titled "Computer on a Card with a Remote Human Interface", filed Dec. 1, 2000, whose inventors are Andrew Heller and Barry Thornton.

U.S. patent application Ser. No. 09/728,669 titled "A System of Co-Located Computers in a Framework Including Removable Function Modules for Adding Modular Functionality", filed Dec. 1, 2000, whose inventor is Barry Thornton.

U.S. Provisional Patent Application Ser. No. 60/720,267 titled "Amorphic Computing", filed Sep. 23, 2005, whose inventor is Barry Thornton.

U.S. Provisional Patent Application Ser. No. 60/720,295 titled "Distributed Computing System", filed Sep. 23, 2005, whose inventor is Barry Thornton.

FIGS. 1A-1C—Computing Systems with Remote Human Interfaces

FIGS. 1A-1C illustrate various embodiments of a computer system, where a computing system 202, preferably a blade computer, is coupled to a remote human interface system 230 via a transmission medium 210, such as an Ethernet line, e.g., standard Category 5 communications cable, using standard Ethernet protocol.

In one embodiment the computer system may include the computing system 202 located at a first location. The computing system 202 preferably includes a processor (not shown), a memory medium (not shown) coupled to the processor, video/graphics logic 205 coupled to the processor, and network logic 204 coupled to the processor, as shown in FIG. 1A. The video/graphics logic may be operable to generate or render image data to refresh a display, e.g., for generating pixel data in a frame buffer.

For the computing system 202, a blade format is preferred, where the blade format comprises a primarily 2-dimensionnal form factor adapted to be placed in a slot of a rack mounted chassis. Thus a plurality of client blades may be co-located in a rack or chassis, wherein each of the client blades may interface to one or more human interface systems. Other computing system form factors may be used as desired. For example, the computing system 202 may be configured as a 3-dimensional form factor contained in a chassis, e.g., a low profile rectangular box. In this embodiment, a plurality of computing systems 202 configured as low profile rectangular chassis' may be co-located in a rack or cage similar to the blades described above.

FIG. 1A illustrates an embodiment in which the transmission medium coupling the computing system 202 to the remote human interface 230 is a 100 Mbit (Mb) Ethernet line (Cat 5, i.e., 4-wire cable), although other transmission media with different transmission rates may be used as desired. It should be noted that in other embodiments, other communication protocols may be used, e.g., TCP/IP, etc., e.g., on top of the Ethernet protocol. In one embodiment, a single transmission medium is shared between a plurality of computing systems 202 and a corresponding plurality of human interface systems 230.

In one embodiment, the transmission medium 210, corresponding specifically to the computing system 202 and the human interface system 230, may provide a direct connection between the computing system 202 and the human interface system 230. The transmission medium 210 couples the network logic of the computing system to an interface device 221, thus providing for digital communications between the computing system 202 and the human interface system 230. This facilitates interaction between a user of the human interface system 230 and the corresponding computing system 202. Note that via the network logic, the video/graphics logic is also coupled via the transmission medium to the interface device 221. Each of the human interface systems may be useable by a user to interface with its corresponding computing system over the transmission medium.

As FIG. 1A shows, the computer system includes human interface system 230. The human interface system 230 may in one embodiment correspond to the respective computing system, where the human interface system is preferably located remotely from the first location. As also shown in FIG. 1A, in some embodiments, the human interface system may include an interface device 221 and one or more human interface devices (or user interface devices) 232 coupled to the interface device 221, e.g., keyboard 112, monitor(s) 116, mouse 114, etc., facilitating interactions between a user and the computing system 202. In some embodiments, one or more additional display devices (or monitors) 116 may also be coupled to the interface device 221. For example, such multi-display systems may be particularly suitable for use in visual data intensive applications, such as stock analysis/trading, call centers, technical support, digital movie or music production and/or editing, video conferencing, airport schedule displays, kiosks, and so forth.

The interface device may comprise network logic for interfacing to a transmission medium or network, and human interface logic. The human interface logic may comprise graphics logic for receiving image or pixel data, assembling an image, and presenting the image on a display. The human interface logic may also comprise logic or circuitry for providing other received human interface signals to/from the other respective human interface devices, such as a mouse, keyboard, speakers, etc.

It should be noted that the user interface devices 232 may include any types of device desired, including but not limited to displays, keyboards, pointing devices, printers, telephones, removable storage media, e.g., an optical drive, a floppy drive, a tape drive, and/or a hard disc drive, biometric sensors, barcode readers, and virtual reality (VR) interface devices, among others. In various embodiments, the interface device may include (or be coupled to) human interface circuitry for communicating device specific signals with the human interface devices of the human interface systems. For example, the human interface circuitry may include video display interface circuitry for communicating video signals to one or more display devices 116, keyboard interface circuitry for communicating keyboard signals with keyboard 112, mouse interface circuitry 114 for communicating signals with mouse 114, printer interface circuitry for communicating printer signals with the printer, telephone interface circuitry for communicating telephone signals with the telephone, removable storage medium interface circuitry for communicating storage medium signals with the removable storage medium, biometric sensor interface circuitry for communicating biometric sensor signals with the biometric sensor, barcode reader interface circuitry for communicating barcode signals with the barcode reader, VR interface device interface circuitry for communicating VR interface device signals with the VR interface device, and so forth, as desired.

As FIG. 1A indicates, in some embodiments the human interface system 230 may optionally include additional user interface devices, e.g., an additional interface device and one or more additional human interface devices (e.g., additional monitors 116) coupled to the additional interface device. It should be noted that specific elements, e.g., interface devices 221A and 221B, may be denoted generically or collectively by their base reference number, e.g. interface device 221.

In some embodiments, the additional interface device(s), e.g., interface device 221B, may be "daisy chained" from the first or original interface device, e.g., interface device 221A of FIG. 1A, although other connection schemes may be used as desired, e.g., connecting multiple interface devices to a hub or switch. For example, in some embodiments, the transmission medium 210 may include one or more repeaters, i.e., hubs or switches, that may extend the effective range between the computing system 202 and the human interface 230, as illustrated in FIG. 1C. In other words, various hubs or switches may be included in the transmission medium 210 to facilitate accurate communications between the computing system(s) 202 and the human interface(s) 230. The transmission medium coupling the computer 202 and the human interface 230 may be of any bandwidth desired, based on the performance requirements of the users, e.g., a 1 Mbit, 1 Gbit, 10 Gbit, 100 Gbit, etc., Ethernet cable, as desired.

Figure 2:
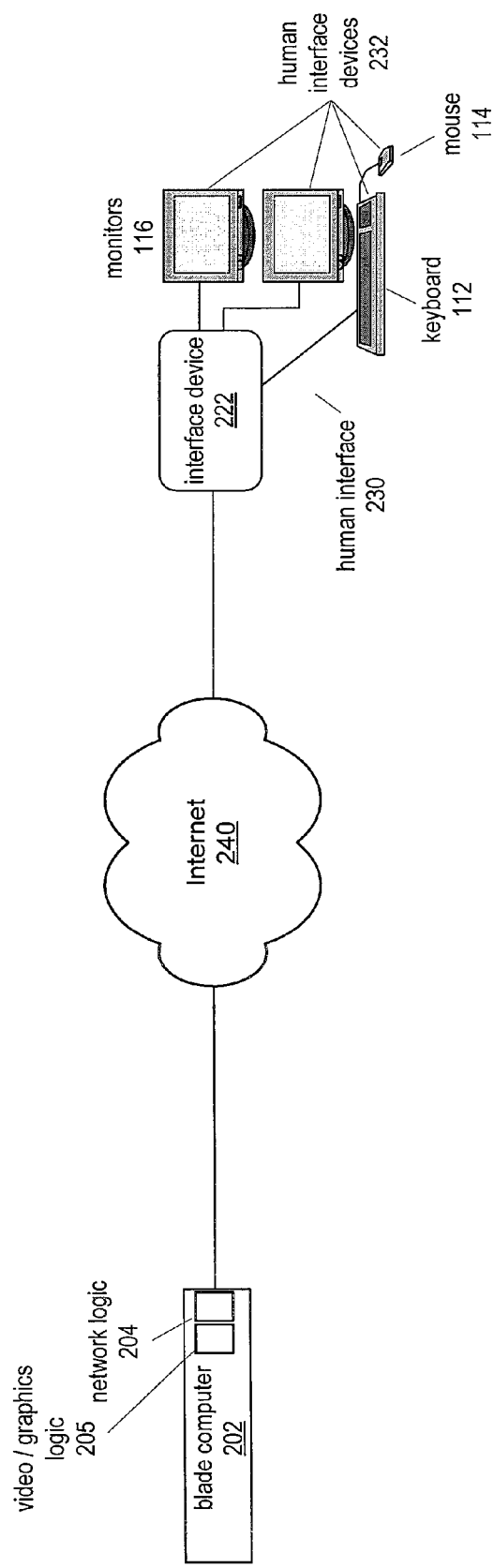
FIG. 2 illustrates a networked computer system with a remote human interface, according to one embodiment.

In some embodiments, and as illustrated in FIGS. 1A-1B and 2, each interface device may support two (or more) display devices, i.e., computer monitors, for example, by including multiple video cards, a specialized dual display video card, or implementing such functionality on a programmable hardware element, e.g., a field programmable gate array (FPGA). The interface device also preferably supports or implements the USB 2.0 communications protocol, thus facilitating use of USB peripherals for the various human interface devices included in the remote human interface.

In the embodiment of FIG. 1A, the computer 202 comprises video/graphics logic as well as various I/O logic for generating I/O signals intended for human interface devices 232. The resultant video signals and I/O signals generated at the computer 202 are then encoded for transmission to the interface device 221 at a remote location. The video signals and I/O signals are then used to drive a display and I/O devices, respectively.

In one embodiment, as shown in FIG. 1B, the interface device 221 may comprise video/graphics logic 205 as well as various I/O logic 206 for interfacing to human interface devices. In this embodiment, the computing system may generate bus signals that are transmitted over the transmission medium 210 (e.g., encoded as IP packets) and sent to the interface device 221. The interface device 221 may receive the bus signals. Video/graphics logic 205 comprised in the interface device 221 may then generate video signals to drive the display in response to the received bus signals. Various I/O logic 206, such as keyboard logic and mouse logic, may generate/receive keyboard and mouse signals, respectively, based on the received bus signals. In this embodiment, the bus signals may be PCI Express bus signals, PCI bus signals, or other bus signals. Thus, in this embodiment, instead of placing the video/graphics logic and other I/O logic in the computing system 202, this functionality may instead be placed in the interface device 221 at the human interface system side.

In preferred embodiments, the user may interact with the computing system substantially as if the human interface were not remotely located with respect to the computing system. In other words, the one or more human interface devices may operate as if they were located in the first location and directly connected by human interface cables to the computing system. In some embodiments, the human interface devices may be located more than 10 feet from the computing system. In other embodiments, the human interface devices may be located more than 20 feet from the computing system. In yet further embodiments, the human interface devices 232 may be located more than 200 meters from the computing system. In other embodiments, the human interface devices 232 may be located in the range of tens, hundreds, or even thousands of kilometers from the respective computing system 202. Note that embodiments of the system described herein preferably facilitate separation distances between human interfaces and their respective computing systems greater than is generally allowed by standard computer interface cabling.

In some embodiments, limited aggregation permitting more than one user direct-connect over a higher bandwidth local network may be supported. For example, as illustrated in FIG. 1C, in some embodiments, the transmission medium may be a high bandwidth transmission line, e.g., a 1 Gbit (Gb) Ethernet line, with hubs 212 at either end coupling respectively to multiple blades (computing systems) 202 and to multiple corresponding user interfaces 230. In other words, a single high capacity transmission line may facilitate direct connectivity between computing systems (blades) 202 and remote human interfaces for a plurality of computer systems. In the embodiment shown in FIG. 1C, the number of such computer systems (computing system plus human interface) is 10, although other embodiments may have different (e.g., greater or lesser) limitations. In some embodiments, there may be an assured full-time 100 Mbit connection between each blade and respective user interface. In other embodiments, there is no assured bandwidth, but rather the bandwidth is dynamically allocated among blades and human interfaces as needed. Other embodiments of such multi-computer systems are described below. Note that in preferred embodiments, each of the plurality of computer systems comprises or functions as a client computer system operable to provide computational resources to at least one user of the respective human interface system.

Further details regarding embodiments of the blade computing systems, interface devices, and their operation, are provided below.

Figure 3:
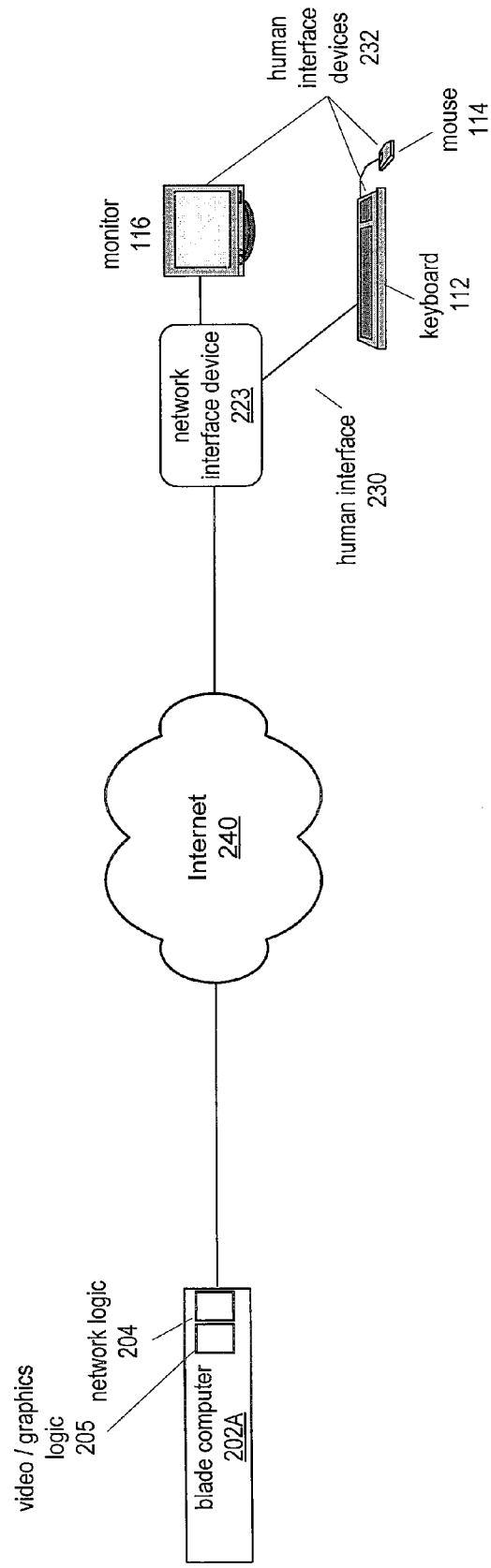
FIG. 3 illustrates an embodiment of a networked computer system with a remote human interface.

FIGS. 2 and 3—Network Based Computer Systems with Remote Human Interfaces FIGS. 2 and 3 illustrate respective embodiments of computer systems with remote human interfaces that utilize a network, e.g., the Internet, for communications between the computer systems and the human interfaces. As FIGS. 2 and 3 indicate, interface device 222 and network logic 204A of computer 202 may differ from that of FIGS. 1A-1C. For example, because the communications between the computing systems and the user interfaces are carried over a network instead of via a direct connection, additional functionality may be provided by the interface devices, and in some embodiments, by the computing systems, as well. As one example of additional functionality, the interface devices may implement network communication protocols such as TCP/IP, as are well known in the art. Of course, in various embodiments, other network related functionality may be implemented in the interface device 222 as needed or desired.

As FIG. 2 shows, in this embodiment, a blade computer 202 may couple to a remote human interface 230 via a network 240, e.g., the Internet. While in preferred embodiments, TCP/IP may be used for communications between the blade computing system and the remote human interface, any other network communication protocols may be used as desired. Note that in general, this network based embodiment of the computer system may have a lower throughput, i.e., performance, than the direct connect embodiments described above with reference to FIGS. 1A-1C, which may constrain video and/or USB performance. Note that in the embodiment shown in FIG. 2, the human interface 230 may include multiple, e.g., dual, monitors, and so the interface device 222 preferably includes video circuitry for providing video signals to each monitor. As noted above, the video circuitry of the interface device that assembles images or video frames based on received pixel data may include a suitably configured programmable hardware element, e.g., an FPGA (FIG. 5), and/or an application specific integrated circuit (ASIC), among other implementations.

It should be noted that the blade computing systems 202 included in the embodiments illustrated in FIGS. 1A-1C, and FIG. 2 may include special functionality in addition to that of a standard personal computer.

FIG. 3 illustrates a network-based embodiment, where a blade computer 202A (with video/graphics logic 205 and network logic 204) couples to a remote human interface 230 via a network 240, such as the Internet. As FIG. 3 indicates, the human interface may include an interface device 223, which in various embodiments may (or may not) differ from interface devices 221 and 222, described above. For example, in the embodiment shown in FIG. 3, the specific configuration of the blade computer 203 may impose constraints on the performance of the system. Thus, as shown in FIG. 3, the user interface 230 may only include one monitor 116, and accordingly, the interface device 223 may only include video circuitry or logic supporting one display. Similarly, the standard blade computer 203 may not include any special cards, e.g., proprietary network logic, etc., but instead may rely primarily on software for managing and implementing the packetized data transmission.

Note that in some embodiments, various portions of the functionality described above may be performed in hardware, software, or combinations of the two. For example, in one embodiment, video/graphics data generated by the video/graphics logic in the computing system may be packetized and otherwise processed by software, e.g., instead of this functionality being performed by the network logic.

Further details regarding embodiments of the blade computer(s) and interface device(s) are provided below.

The embodiments described above with reference to FIGS. 1A-3 illustrate single blade/single user interface systems. In many embodiments, the system may include multiple co-located blade computing systems with corresponding multiple human interfaces. For example, a plurality of blades (202 and/or 203) may be installed in respective slots in a "cage", e.g., a rack mounted chassis or cabinet, as described below with reference to FIG. 4. The plurality of blades 202 may be configured to operate with a plurality of human interface systems 230. The human interface systems 230 may be distributed in user office locations in a single building or may be widely dispersed in a geographic region, such as a city, country, or the entire world.

In one embodiment, a first plurality of computers 202 supports a second greater plurality of human interface systems 230. Thus, for example, one blade 202 may support two or more human interface systems and hence two or more users. One blade 202 may support two or more human interface systems and hence two or more users concurrently and/or in a time sliced manner.

In one common configuration, a company may have a room where a plurality of co-located blade computing systems 202 are located in a rack, and these blade computers 202 may connect over a LAN to various human interface co-located blade computing systems 202 systems located in various offices or cubicles. In one embodiment a first number X of co-located computing systems 202 provide computing capability to a second number Y of human interface systems, or a second number Y of users, where Y is greater than X, e.g., Y is 2X, 3X, 4X, etc. In this embodiment, one computer 202 may be assigned to each of two or more users.

Figure 4:
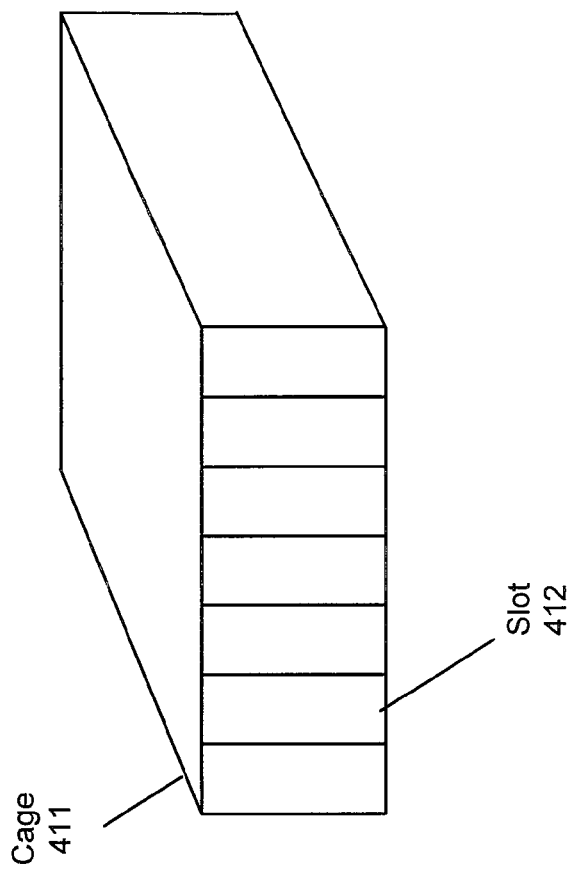
FIG. 4 illustrates a system with multiple co-located computing systems, according to one embodiment.
Figure 4:
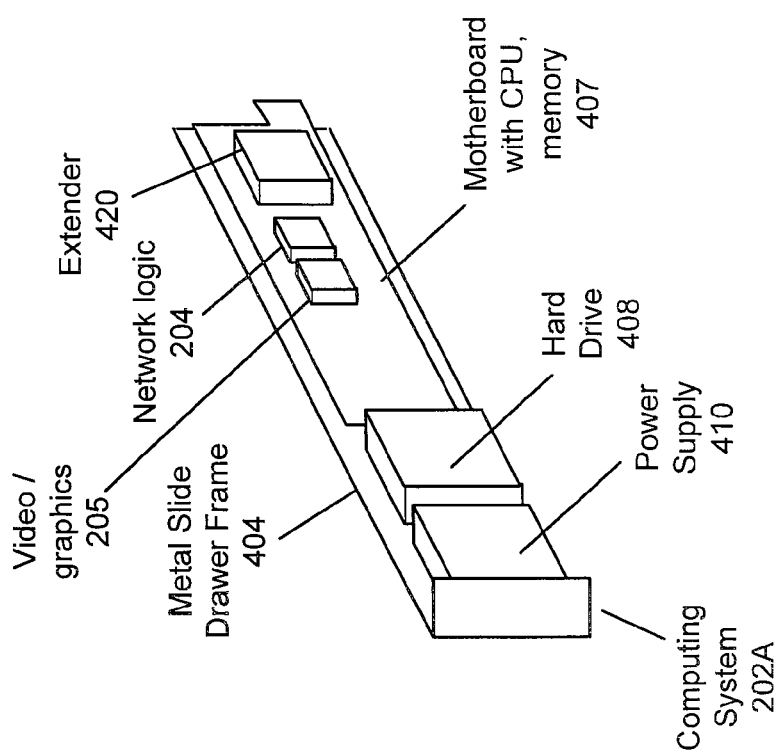

FIG. 4—Exemplary Blade Computer and Cage

FIG. 4 illustrates one embodiment of a blade computing system 202 suitable for implementing various embodiments of the invention, as well as an exemplary chassis or cage 411, operable to receive a plurality of such blades into respective slots 412, and to facilitate connection of the plurality of blades to the transmission medium for communication with the corresponding plurality of human interfaces 230. Each of the embodiments described above in FIGS. 1A, 1B, 1C, 2 and 3 may operate as a system of co-located computer systems communicating with a plurality of remote human interface systems, where the plurality of remote human interface systems may be distributed in various offices or homes in one or more geographic locations.

As FIG. 4 shows, in some embodiments, the computing system 202(A) may include a motherboard 407 with processor (e.g., CPU), memory (i.e., a memory medium), video/graphics logic 205, and networking logic 204, as well as a power supply 410, and possibly a hard drive 408. Thus, the computing system 202 or 202A, referred to generically as computing system 202, may comprise a "computer on a card", also referred to as a "computer card" or "blade". In addition to network logic 204, the computing system 202 may further include software, e.g., extender software 420 that may facilitate communications with a human interface located remotely from the computing system 202. Note that the components and their arrangements are intended to be representational only, and are not intended to illustrate actual component design and layout.

In one embodiment the computing system 202 may include a cabinet, referred to as a cage 411, having a plurality of slots 412. The computer card may be adapted to be inserted into one of the slots of the cage. The computer card 202 may be operable to slide into a slot 412 of the cage 411, thereby making contact with a cage connector which may couple to the transmission medium 210 or 240. Thus, the computer card may comprise a complete PC on a single slide drawer frame 404 which in some embodiments may be only 3 rack units high (5.25 inches), and thus may occupy a much smaller space than standard PC units. The cage 411 may be operable to receive a plurality of such computer cards via the plurality of slots 412, thus providing a means for co-locating a plurality of computing systems, each having a remote human interface, as described above.

The cage may include a backplane or communication medium connecting each of the cage connectors, thereby enabling networking of the computer cards, such as an Ethernet network. Thus the cage connector may provide for network connectivity between the computing systems 202 as well as external WAN connectivity, e.g., Internet connectivity. Further details of some embodiments of the computer card may be found in U.S. patent application Ser. No. 09/728,667 titled "Computer on a Card with a Remote Human Interface", and U.S. patent application Ser. No. 09/728,669 titled "A System of Co-Located Computers in a Framework Including Removable Function Modules for Adding Modular Functionality" which are both incorporated by reference above.

Note that the cage illustrated in FIG. 4 is meant to be exemplary only. In various embodiments, the cage may include more or less slots than shown, and/or may include multiple shelves with additional slots. In another embodiment, multiple cages such as that shown in FIG. 4 may be stacked or otherwise assembled and interconnected to form a composite, and optionally expandable, cage. As noted above, in some embodiments, each cage may be rack mountable, such that a plurality of such cages may be installed in a rack mount structure.

Figure 5:
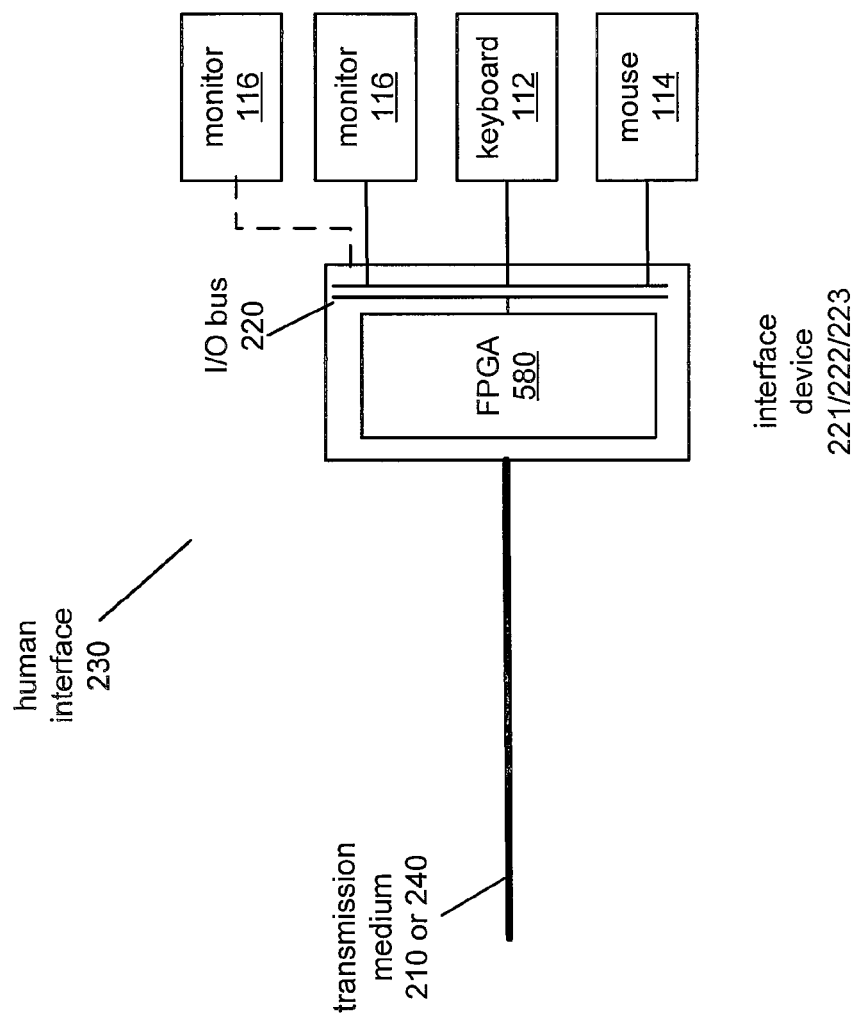
FIG. 5 illustrates a human interface with an interface device, according to one embodiment.

FIG. 5—Human Interface with Interface Device

FIG. 5 illustrates an exemplary human interface suitable for use with various embodiments of the invention described herein. Note that the particular user interface components shown are meant to be illustrative only, and are not intended to limit the user interface to any particular devices or components.

As FIG. 5 shows, in this embodiment, interface device 221, 222, or 223, may be interposed between transmission medium 210 or 240 (which preferably couples to a plurality of co-located computing systems) and user interface (human interface) device(s) of the human interface 230. As indicated, the interface device may include a programmable hardware element 580, e.g., a field programmable hardware element (FPGA) 580, configured to provide network interface functionality for user interface device(s) coupled thereto, such as, for example, mouse 114, keyboard 112, and monitor 116 (and optionally, a second monitor, as shown), among others.

In one embodiment, the interface device may include a programmable hardware element (e.g., FPGA) 580 configured to implement dual process functionality. More specifically, the programmable hardware element 580 may be configured to process non-video I/O signals and video signals substantially concurrently, i.e., sending and receiving the non-video I/O signals to and from the non-video related various human interface devices, e.g., keyboard, mouse, printer, etc., and assembling and providing video images to the monitor(s), as well as communicating with the computing system via packetized signal data.

The programmable hardware element may be configured to implement or execute a processor and small kernel operating system (OS) to process these video and non-video I/O signals. In preferred embodiments, the small kernel operating system may serve only or primarily to perform this functionality. In some embodiments, the programmable hardware element may include or be coupled to a memory medium for assembling and storing video frames prior to sending the images to the monitor for display. In other words, the memory medium may serve as a video buffer for the video-related portion of the programmable hardware element. Thus, in some embodiments, the programmable hardware element may be configured (in conjunction with the memory medium) to receive image or pixel data, (in some embodiments, packetized image data) originating from a video card (or multiple video cards) comprised in the computing system, assemble an image or video frame based on the received image or pixel data (in some embodiments, after extracting or recovering the image or pixel data from received data packets), and provide the image or video frame to the monitor for display. Regarding the non-video I/O signals, the programmable hardware element may be configured to translate I/O signals between network (e.g., Internet) transmissible packets, e.g., TCP/IP/Ethernet packets and I/O bus signals used by the various I/O devices, i.e., non-video human interface devices. For example, in a preferred embodiment, the human interface devices may use the USB 2 protocol, and so the programmable hardware element may be configured to translate between USB 2 signals and network packets used to communicate with the computing system over the network.

One example of a small kernel OS is Pharlap, although any other small kernel OS may be used as needed or desired. The OS may be executable by the interface device to manage and/or implement network interface functionality for the user interface devices. For example, in one embodiment, the interface device may implement the Remote Desktop Protocol (RDP) for managing the remote interface. In preferred embodiments, the interface device may be operable to decompress video signals for display on a monitor, support USB 2 communications, and route communications traffic, e.g., between each interface device and a computing system configured to provide computational resources to the user of the remote user interface.

In one embodiment, the interface device may also include human interface circuitry, e.g., in addition to the programmable hardware element, or configured on the programmable hardware element. For example, in embodiments where the one or more human interface devices include one or more display monitors, the human interface circuitry may include video display circuitry for providing video signals to the one or more display monitors. Similarly, in embodiments where the one or more human interface devices include a keyboard, the human interface circuitry may include keyboard circuitry for communicating keyboard signals with the keyboard. As yet another example, in embodiments where the one or more human interface devices include a pointing device, the human interface circuitry may include pointing device circuitry for communicating pointing device signals with the pointing device. Of course, other interface devices may require that the interface device include further human interface circuitry. Note that, as indicated in FIG. 5, in some embodiments, an I/O bus may be used to communicatively couple the programmable hardware element (e.g., FPGA) to the human interface devices.

The programmable hardware element 480 may be configured with a hardware description (e.g., a bit file or net list) that configures the network. In one embodiment, a computer system, such as a blade 202 or other computer system, may be operable to download new hardware descriptions to the interface device 221/222/223, e.g., to update the functionality or capability of the interface device 221/222/223.

In some embodiments, instead of (or in addition to) a programmable hardware element providing the functionality described above, the interface device may include an application specific integrated circuit (ASIC) for these functions, as mentioned above.

It should be noted that the remote human interfaces 230 described herein, including the interface devices, are preferably not capable of general purpose computer functionality. In other words, the remote user interfaces are specifically not client computer systems as generally understood. For example, the human interfaces 230 cannot execute web browsers, or other standard applications. Rather, as described above, the functionality of the interface device is preferably limited to boot-up and execution of the small kernel operating system, which implements and facilitates communications between the human interface and the computing system or systems, and optionally, may be operable to perform a discovery process to detect, and establish communications with, the human interface devices coupled to the interface device and/or the computing system(s).

As indicated above with reference to FIG. 1A, in some embodiments, the human interface may include one or more additional interface devices, e.g., daisy chained from the first interface device. In these embodiments, the interface device may also include circuitry and/or ports or jacks for such connections. In some embodiments, in addition to, or instead of, daisy chaining the interface devices, one or more of the interface devices may operate as a hub for additional interface devices, and so may include circuitry (and/or configuration) implementing this functionality.

Figure 6:
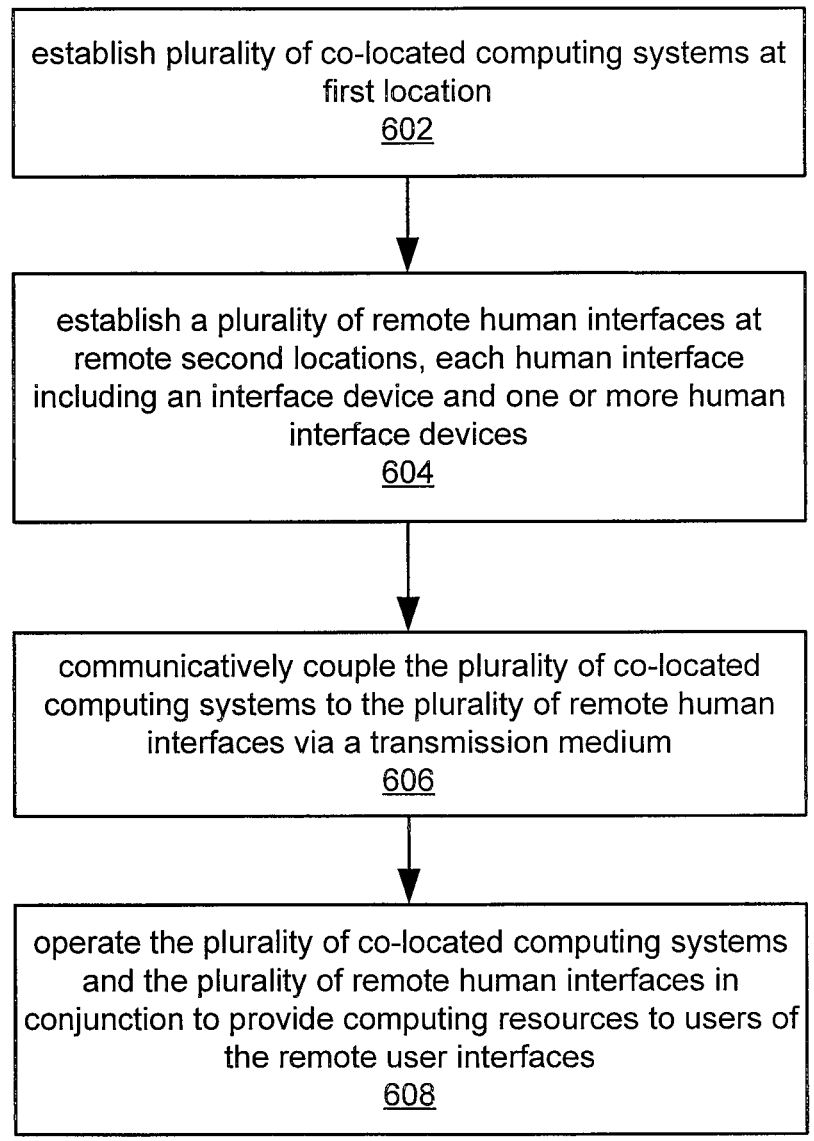
FIG. 6 is a flowchart of a method for operating a computer system with remote human interfaces, according to one embodiment.

FIG. 6—Flowchart of a Method for Operating a Computer System with Remote Human Interfaces FIG. 6 is a high level flowchart of a method for operating a plurality of co-located computing systems with remote human interfaces, according to one embodiment. It should be noted that in various embodiments, one or more of the following method elements may be performed concurrently, in a different order than shown, or may be omitted entirely. Other additional method elements may also be performed as desired.

As FIG. 6 shows, in 602, a plurality of co-located computing systems may be established at a first location. In preferred embodiments, the co-located computing systems may be blade computers installed in a cage, as described above, where the cage is preferably located in a climate controlled "computer room" or computer resource facility. As will be described below in detail, the computer resource facility (with installed co-located computing systems) may be owned and operated by a company or other organization (i.e., enterprise) to provide computational resources for the company or organization, or, alternatively, may be owned and operated by first company or organization (i.e., enterprise) to provide computational resources to other entities, e.g., to other companies, organizations, and/or individuals or homes.

In 604, a plurality of remote human interfaces may be established at remote second locations, e.g., each second location (or most second locations) being remote from the first location. Each of the remote human interfaces may include an interface device and one or more human interface devices, as described above. As will be described in detail below, the human interfaces may be used by employees or associates of a single enterprise, and/or by employees or associates of one or more enterprises that are distinct from the entity that owns and operates the co-located computing systems.

In 606, the plurality of co-located computing systems (e.g., blades) may be communicatively coupled to the plurality of remote human interfaces via a transmission medium. For example, as described above, in one embodiment, each computing system may be coupled to a respective transmission medium, e.g., a Cat 5 (4-twisted pair) cable, e.g., an Ethernet cable, which in turn may be coupled to a corresponding remote human interface. In another embodiment, multiple computing systems may be coupled via a first hub or switch to a single high-bandwidth transmission cable, e.g., a 1 Gb Ethernet cable, which in turn may be coupled to a second hub or switch, which may then be coupled to each of a corresponding multiple remote user interfaces. In a further embodiment, the plurality of co-located computing systems (e.g., blades) may be communicatively coupled to the plurality of remote human interfaces via a network. For example, in a single enterprise embodiment, the network may be a local area network (LAN). In other embodiments, e.g., those servicing multiple enterprises, the network may be a wide area network (WAN), such as the Internet. Note that any network protocols may be used as desired for communicating over the network, e.g., Ethernet (including wireless). Other network technologies contemplated include switched fabric networks, e.g., using the Infiniband protocol, among others.

Finally, as indicated in 608, the plurality of co-located computing systems and the plurality of remote user interfaces may be operated in conjunction to provide computer resources to users of the remote human interfaces. It should be noted that computer resources may refer to hardware, software, or any combination of the two. Additionally, in various embodiments, such resources may be allocated and used serially, in parallel, and/or in an interleaved fashion. Further discussion of computer resource management and use is provided below with reference to FIGS. 8 and 9.

Figure 7A:
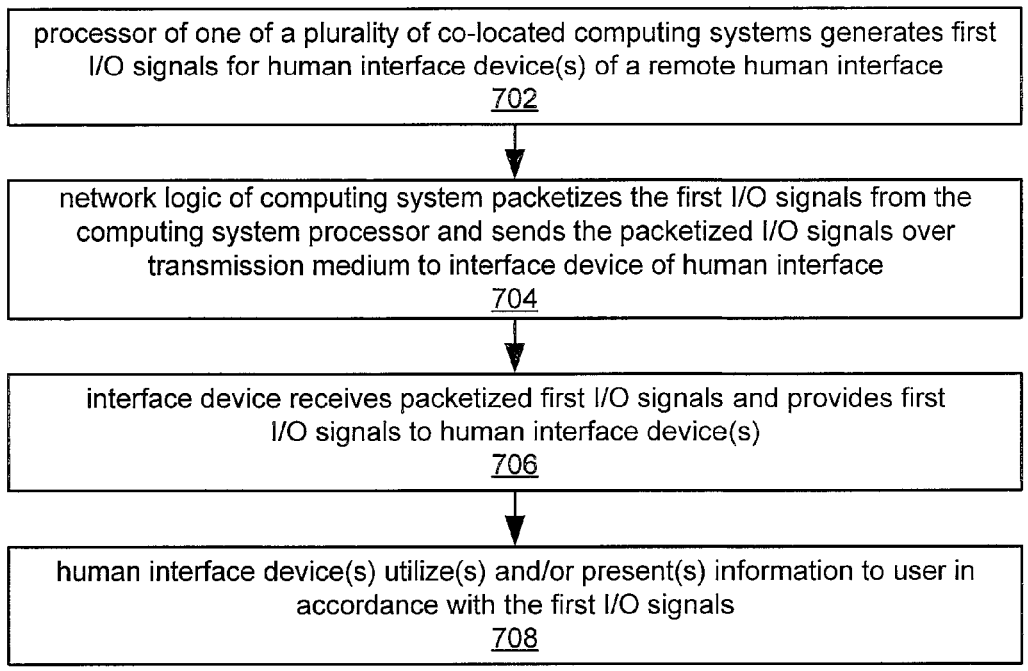
FIGS. 7A and 7B are flowcharts of embodiments of a method for operating a computer system, according to one embodiment.
Figure 7B:
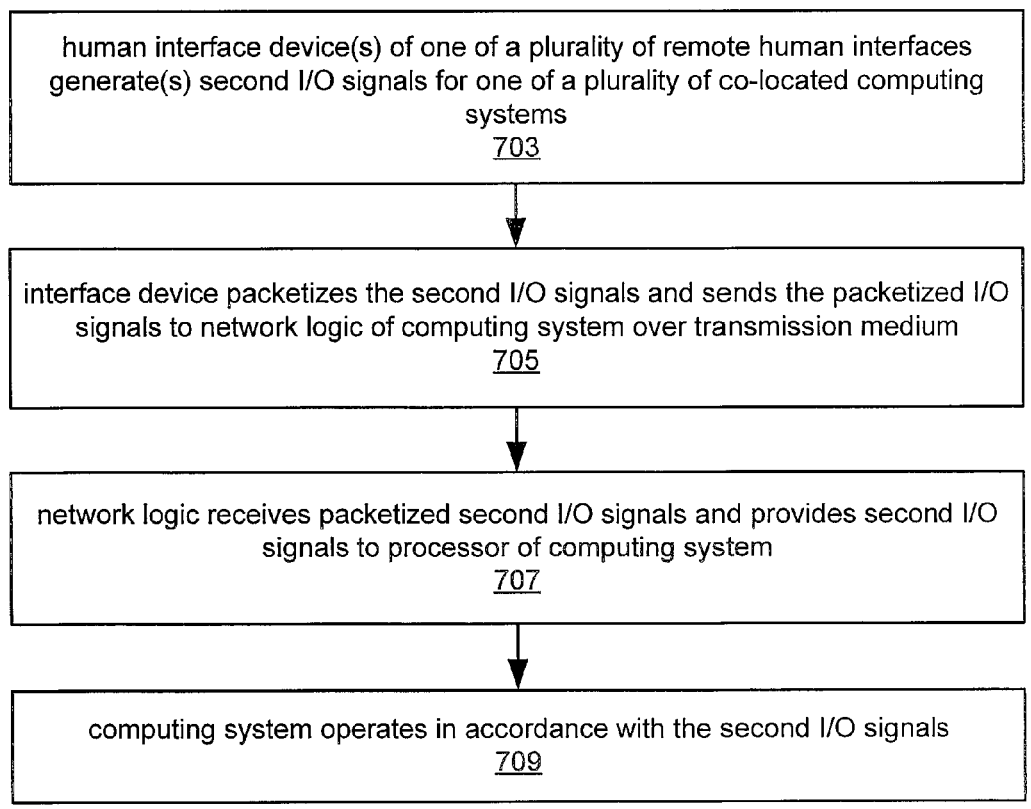

FIGS. 7A and 7B—Methods of Use for A Computer System with Remote User Interfaces FIGS. 7A and 7B flowchart more detailed embodiments of methods of use for operating a plurality of co-located computing systems with remote human interfaces, according to one embodiment. As noted above, in various embodiments, one or more of the following method elements may be performed concurrently, in a different order than shown, or may be omitted entirely. Other additional method elements may also be performed as desired.

FIG. 7A flowcharts an exemplary description of the system's operation for communicating signals from the computing system 202 (or 202A) to the human interface 230, according to one embodiment.

In 702, a processor of one of a plurality of co-located computing systems, preferably blade computers, at a first location, may generate first I/O signals for one or more human interface devices of a remote human interface system. As described above, the computing system preferably includes the processor, a memory medium coupled to the processor, video/graphics logic for generating or rendering image data to refresh a display, e.g., for generating pixel data in a frame buffer, I/O logic for generating I/O signals, such as keyboard and mouse signals, and network logic (coupled to the processor) for implementing and managing network communications, among other components, as described above with reference to FIG. 4. As noted above, in one embodiment, the video/graphics logic and the I/O logic may be located in the interface device at the human interface system side, and the computing system 202 may transmit bus signals, e.g., PCI Express bus signals, to the interface device, where the video/graphics data and I/O signals are generated for provision to the display and human interface devices.

The remote human interface system, one of a plurality of remote human interface systems, may be located at a second location that is remote from the first location, and may include one or more human interface devices, such as for example, a keyboard, mouse, one or more monitors, and so forth, as well as an interface device, for mediating packet based data communications with the computing system. As noted above, each of the human interface devices preferably couples to the interface device.

As described above, in some embodiments, each respective one of the human interface systems corresponds to one of the plurality of computing systems, although it should be noted that in other embodiments, described below, there may not necessarily be a one-to-one correspondence between the computing systems and the human interface systems. For example, a computing system may be used by more than one user, i.e., be associated with or dynamically assigned to more than one remote human interface, or conversely, more than one computing system may be used by a single user. In further embodiments, the computing systems and their respective software resources may be managed as a common pool (or a plurality of pools) of computer resources, where any user (associated with a user interface) may utilize any of the resources available for use, as will be described in detail below.

In one embodiment, for each computing system and respective human interface system, the computing system includes a first bus, and the interface device includes a second bus and human interface circuitry. Thus, in some embodiments, the computing system may generate first bus signals onto the first bus for communication with the respective one or more human interface devices. Examples of possible buses contemplated for use may include, but are not limited to, PCI, PCI Express, and USB (1 or 2), among others. Note that in various embodiments, the first and second buses may be the same type of bus, or may be different types of bus.

In some embodiments, each of the network logic and the interface device includes parallel/serial transceivers for converting parallel data generated on the first bus and second bus, respectively, to serial data for transmission over the transmission medium (i.e., serial transmission medium, such as an Ethernet cable or network) and for converting serial data received from the (serial) transmission medium to parallel data for generation on the first bus and second bus, respectively.

In 704, the network logic (included in the computing system) may packetize the first I/O signals from the processor, and send the packetized first I/O signals over a transmission medium, e.g., transmission medium 210 or 240 (network, e.g., a LAN or the Internet), to an interface device (221, 222, or 223) of the remote human interface system 230. The first I/O signals may include both video/graphics data from the video/graphics logic, and non-video I/O signals intended for human interface devices included in the remote human interface system, e.g., keyboard, mouse, speakers, and so forth. Thus, the video/graphics logic may render an image, i.e., generate pixel data for an image, and provide these pixel data to the network logic, which may packetize (and compress) the pixel data and the non-video I/O signals for transmission over the transmission medium.

As described above, the transmission medium may include separate respective transmission lines, e.g., 100 Mb Ethernet lines (e.g., Cat 5 cables), for each computing system/human interface pair; a high-bandwidth transmission cable (e.g., a 1 Gb Ethernet line) for communicating between multiple computing systems and their respective human interfaces; and/or a network, e.g., a LAN or the Internet.

In one embodiment, to packetize the first I/O signals, the network logic may receive and packetize the first bus signals generated on the first bus by the computing system for transmission to the interface device.

In 706, the interface device (included in the remote human interface) may receive the packetized first I/O signals (including video signals) over the transmission medium. The interface device may extract the signals from the data packet(s), and may provide the first I/O signals and to the one or more human interface devices. For example, in one embodiment, the interface device may process the video/graphics data and the non-video I/O signals, and provide the processed signals to the monitor and other human interface devices, respectively. For example, processing the video/graphics data may include recovering or extracting the first I/O signals from the received data packets, where the extracted video/graphics data may be assembled into an image, e.g., in a frame buffer, and provided to the monitor for display, and the extracted non-video I/O signals provided to the keyboard, mouse, speakers, etc. It should be noted that the interface device in one embodiment does not include the functionality of a graphics card, i.e., of the video/graphics logic comprised in the computing system. In other words, the interface device may operate to assemble an image or video frame from received pixel data, e.g., from image data extracted or recovered from received data packets.

In one embodiment, to provide the first I/O signals to the one or more human interface devices, the interface device may receive and convert the packetized first bus signals received from the network logic into second bus signals on the second bus. The human interface circuitry may receive the second bus signals and provide human interface signals to the one or more human interface devices in response.

Finally, as indicated in 708, the one or more human interface devices of the remote human interface may utilize, and/or present information to a user in accordance with, the first I/O signals. In other words, the human interface device(s) may then operate in accordance with the received first I/O signals. For example, a monitor may display a video image, speakers may generate sounds, and so forth.

FIG. 7B flowcharts an exemplary description of the system's operation for communicating signals from the human interface 230 to the computing system 202 (or 202A), according to one embodiment. Note that the method of FIG. 7B is assumed to be performed by embodiments of the system whose operation is described in FIG. 7A, and so descriptions of system elements already described above may be abbreviated.

In 703, one or more human interface devices of a human interface system may generate human interface signals in response to user input, where the human interface signals may be intended for a respective computing system of the plurality of co-located computing systems, e.g., blade computers. As described above, the co-located computing systems are preferably located at a first location, and the remote human interface system is one of a plurality of such interface systems, each human interface system located at a respective second location remote from the first location.

In 705, the interface device (of a remote human interface) may packetize second I/O signals from the one or more human interface devices of a human interface system, and may send the packetized second I/O signals over a transmission medium (described above) to the network logic of a computing system, e.g., a blade computer of the plurality of co-located blade computers.

As noted above, in some embodiments, for each computing system and respective human interface system, the computing system may include a first bus, and the interface device may include a second bus and human interface circuitry. In these embodiments, to packetize the second I/O signals from the one or more human interface devices and send the packetized second I/O signals over the respective transmission medium to the network logic, the human interface circuitry may be operable to receive the human interface signals from the one or more human interface devices and generate first bus signals on the second bus, and the interface device may packetize the first bus signals for transmission to the network logic, and send the packetized first bus signals to the network logic of the computing system, In 707, the network logic of the computing systems may receive the packetized second I/O signals over transmission medium, and may extract the I/O signals from the received packets. The network logic may then provide the second I/O signals to the processor of the computing system.

In some embodiments, to receive the packetized second I/O signals over the transmission medium and provide the second I/O signals to the processor, the network logic may receive the packetized first bus signals and convert the first bus signals received from the interface device into second bus signals on the first bus. For example, if the first bus is a USB 2.0 bus, and the packets are TCP/IP packets, the network logic may convert the (TCP/IP) packetized signals into USB 2.0 signals.

In 709, the computing system (e.g., blade) may operate in accordance with the received second I/O signals.

In some embodiments, the computing system may receive the second bus signals and perform operations based on the second bus signals. For example, mouse position button data from the human interface may initiate a GUI event, such as activation of a file window, selection of a GUI element option, and forth.

Note that in preferred embodiments, the video/graphics logic, network logic and the first bus are included on the computing system, e.g., on a circuit card of the blade computer. On the human interface side, in some embodiments, the second bus and human interface circuitry may be included in the interface device. In some embodiments, the interface device, the second bus, and the human interface circuitry may be included in a first human interface device of the one or more human interface devices. For example, these components may be included in a display device or monitor, such that other human interface devices, such as keyboard, mouse, etc., may be plugged into the monitor to communicatively couple the devices to the computing system.

Thus, via embodiments of the methods of FIGS. 7A and 7B, each of the human interface systems may be useable by a user to interface with a corresponding (or dynamically assigned) computing system. Note that in preferred embodiments, embodiments of the above methods are performed by each of the plurality of computing systems and remote human interfaces. In other words, the above methods may be used by any of the computing systems and human interfaces as needed.

As mentioned above, while the above-described embodiments are based on the use of blade computers, other types of computing systems and form factors are also contemplated. Thus, while a blade computer (computing system) preferably includes a processor, memory medium, and power supply on a circuit card (see FIG. 4), in other embodiments, each computing system may include, in addition to a processor and memory medium, a chassis, and power supply, where the processor, the memory medium, and the power supply are comprised in the chassis.

Utility Computing

The techniques described above may be applied in various multi-computer systems to increase the efficiency and flexibility of providing computer resources to users. More specifically, embodiments of the systems and methods described herein may be particularly suited for implementing systems according to a utility computing model. In the utility computing model described herein, hardware and/or software resources are provided to users over a network in accordance with their specific needs. In other words, pools of hardware and/or software resources may be provided to users of an organization for a fee. Human interface devices and interface devices may also be leased for a fee, as well as network bandwidth or Internet connectivity and other services, such as videoconferencing services, telephone services, and TV services, among others.

The utility computing model described herein may be used to provide client computing capabilities to various users. The utility computing model described herein may also be used to provide server capabilities to an enterprise, such as file server capabilities, email server capabilities, media server (e.g., videoconferencing) capabilities, and other types of computing capabilities.

It should be noted that the system described herein is not a client/server system, which, as is well known, includes a server computer that stores application software, coupled to one or more client computers over a network, where each client computer sends requests for application services over the network from the server computer, which downloads the appropriate application software and/or data to the client computer over the network. In the present invention, the user interacts with a computing system (or computer systems) via a remote human interface that is not itself a computer, i.e., as opposed to using a client computer system. Thus, according to the present invention, the computers that are accessed over the network execute application software and provide results of this execution to the users over the network via the remote human interface systems, where the remote human interface systems (e.g., the interface devices) are not themselves general purpose computers, in direct contrast to client computers.

One such system is described below with reference to FIG. 8. FIG. 9 flowcharts one embodiment of the operation of the system of FIG. 8.

Figure 8:
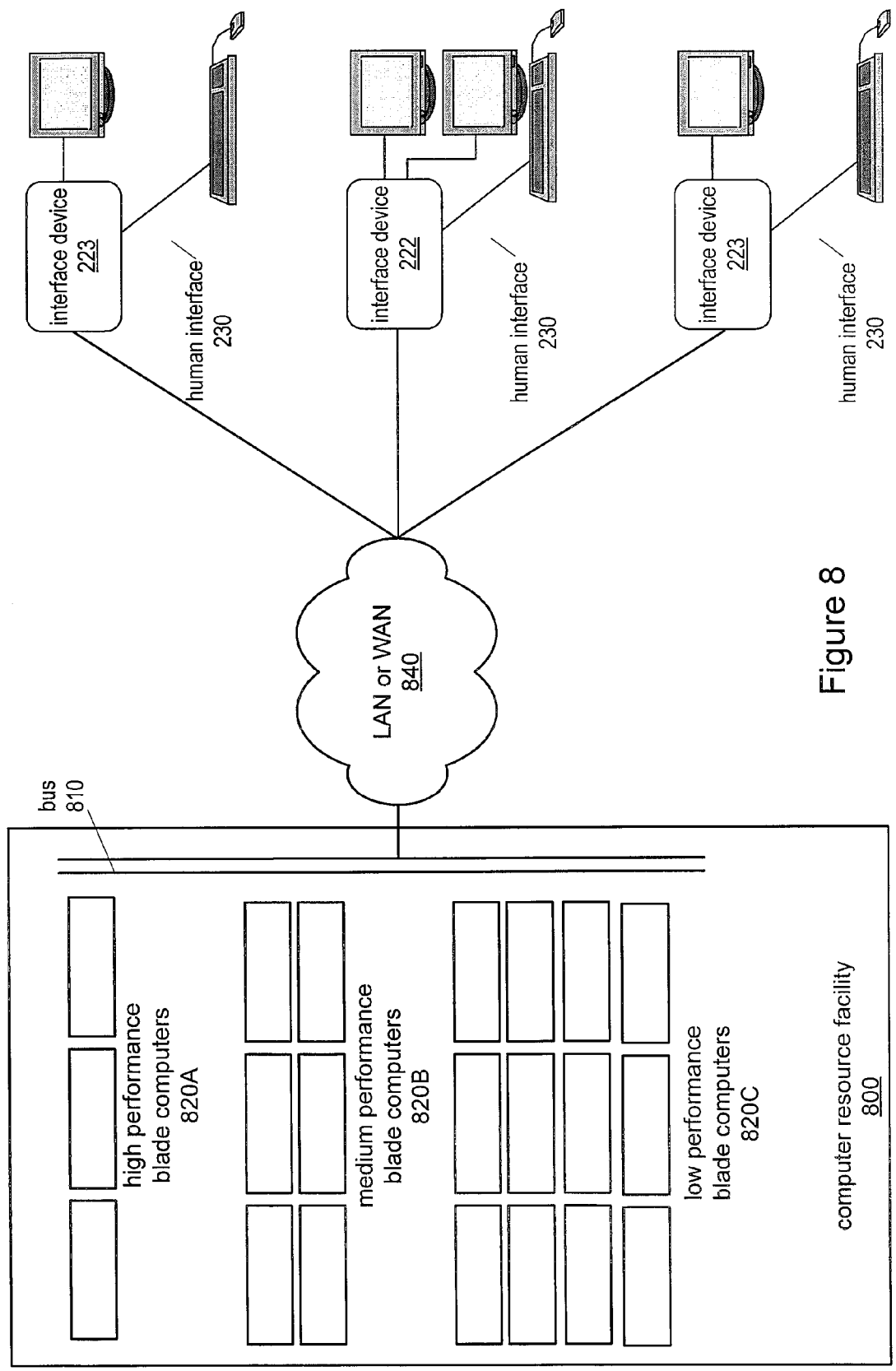
FIG. 8 illustrates a hierarchy of computer resources in a utility computing system, according to one embodiment.
Figure 9:
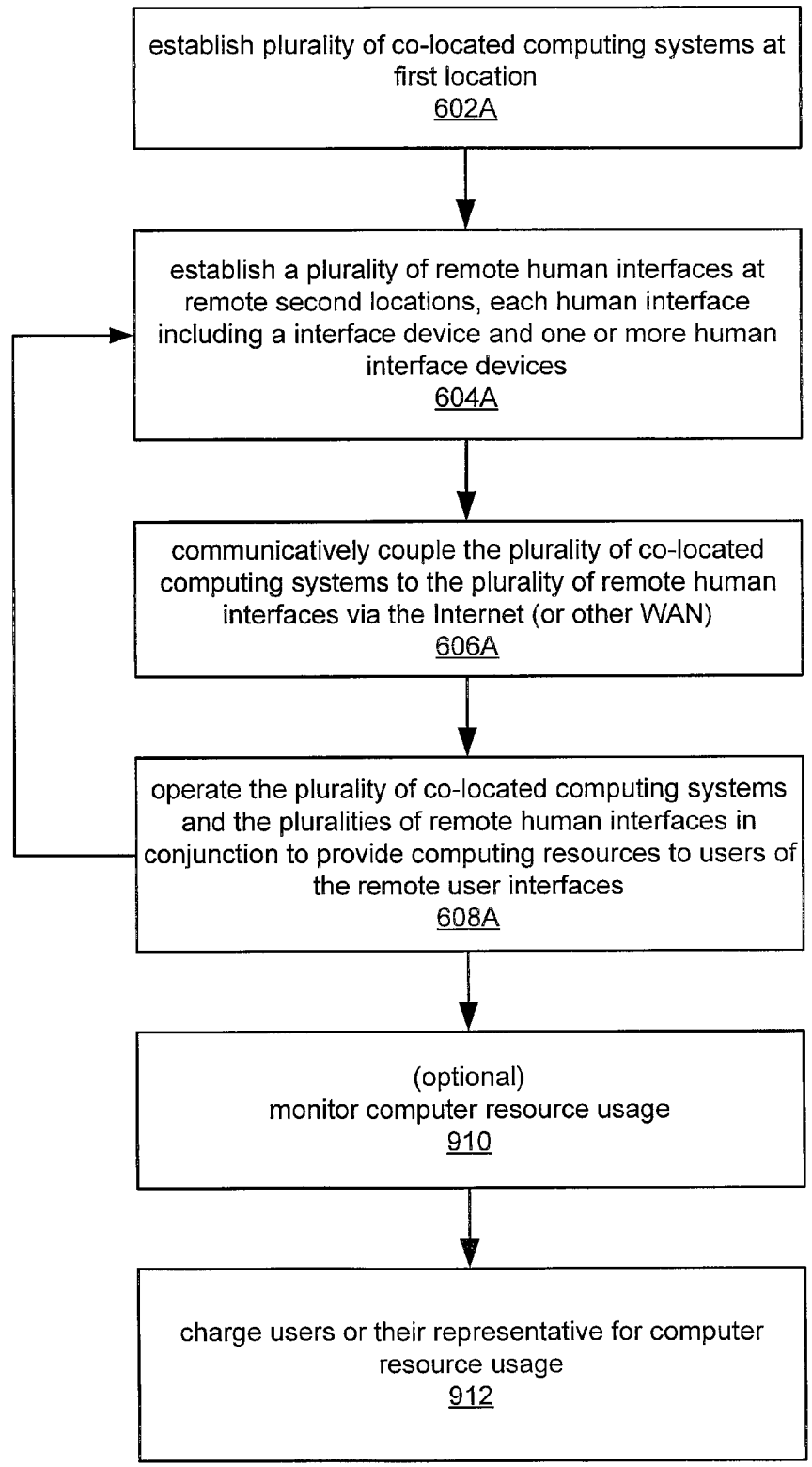
FIG. 9 is a flowchart of a method for operating embodiments of the system of FIG. 8, according to one embodiment.

FIGS. 8 and 9—Utility Computing Systems and Exemplary Operation

FIG. 8 is a high level diagram illustrating a co-located multi-computer system with remote human interfaces coupled to the computing systems over a local area network (LAN) or a wide area network (WAN), such as the Internet. In this exemplary embodiment, available computer resources, i.e., hardware and/or software resources, are optionally tiered, i.e., hierarchically organized, managed, and provided to users, based on performance characteristics and/or user characteristics. Using such a system, an entity, such as a business or organization, may efficiently and intelligently allocate computer resources, i.e., hardware computational capacity, bandwidth, and/or memory, and software applications, to employees or other users working for or with the entity. In addition, or alternately, the system may be used by a first entity, e.g., a first business, to provide computer resources to other entities, e.g., businesses, organizations, or even households, preferably for charge. FIG. 9 flowcharts exemplary operation of the system of FIG. 8.

As FIG. 8 shows, a LAN or WAN based computer resource facility 800, e.g., at a first location, may include a plurality of co-located computing systems 820, where the co-located computing systems comprise a hierarchy of computer resources based on performance. In other words, the plurality of co-located computing systems 820 may include hardware and software with a variety of performance levels, where these computer resources are organized and managed as a tiered system. For example, in the particular embodiment illustrated in FIG. 8, the computing systems are blade computers, as described above, organized into low-, medium-, and high-performance computing systems, although other hierarchies, e.g., with different levels of performance, are also contemplated. In one embodiment, the hardware and/or software resources may be provided without any tiered structure.

Note that the numbers of computing systems (and tiers) illustrated in FIG. 8 are meant to be illustrative only, and are not intended to limit the number of computing systems (or any other computer resources) to any particular amount. Rather, it is contemplated that in various embodiments, the number of computing systems provided may range from a few to hundreds or even thousands. Note also that in the embodiment of FIG. 8, the hierarchy of computer resources includes many low-performing computing systems, a lesser number of medium-performing computing systems, and a least number of high-performing computing systems, based on the assumption that most users do not need high performance computer resources very often. However, in various embodiments, e.g., based on the needs of the users, various other performance tiered populations may be provided, e.g., equal numbers of computing systems at each performance level, computing systems with many different combinations of (hardware and/or software) components with different performances, or only one performance level, etc., as desired and/or needed.

As used herein, the term "performance" refers to the degree of functionality of hardware and/or software that may be made available to a user, including but not limited to, hardware computation capacity, hardware memory capacity, communication bandwidth, software application computational demands, software application cost, and operating system attributes, among others. Thus, in some embodiments, the various performance levels and corresponding hierarchy or tiers of the computer resources may be more complex or subtle than the simple low-, medium-, and high-performance computing systems shown in FIG. 8. For example, a fast computer running many instances of a word processor may be considered to be a lower performance resource than a similar computer running a single demanding application. As will be described below in more detail, in some embodiments, the various resources may be managed and allocated in terms of tasks, where a task refers to a specified use of one or more computer resources, such as, for example, word processing with a specified limit on document size, or running a complex simulation, among others.

Note that in preferred embodiments, the computer resource facility 800 is comprised in one room of a business, organization, or enterprise, although in various other embodiments, the computer resource facility 800 may comprise one or more computer rooms in a building or buildings, or may occupy substantially all of a building, i.e., may comprise an "IT" (information technology) building, where the facility is considered to be at a single location, e.g., the first location mentioned above. In the embodiment shown, the computer resource facility 800 includes a bus 810, e.g., an Ethernet bus, that communicatively couples the plurality of co-located computing systems 820 to a LAN or WAN 840.

As FIG. 8 also shows, the system preferably includes a plurality of remote human interface systems at different respective second locations, where each of the second locations are remote from the first location, and where the second locations may be at separate, i.e., distinct, locations, e.g., each second location may be at a different place, each remote from the co-located computing systems, i.e., remote from the first location. In some embodiments, one or more of the second locations may be remote from some or all of the other second locations. In other words, some or all of the human interface systems may be remote from each other, as well as from the co-located computing systems.

As may be seen, the plurality of remote human interface systems are coupled to the plurality of co-located computing systems over the LAN or WAN. Note that in the embodiment shown, the various remote human interface systems 230 include particular embodiments described above, e.g., including interface devices 222 and 223, although in other embodiments, other kinds of remote human interfaces may be used. It should also be noted that while only three human interface systems 230 are illustrated in FIG. 8, in practice any number of human interface systems may be used as desired, and in fact, the number of human interface systems 230 used in such systems is likely to range from a few to possibly thousands, depending on the size of the businesses or organizations.

In some embodiments, the resource usage of users or groups of users may be monitored and resulting usage information analyzed to aid in managing and allocating the resources. For example, the needs and resource usage of different departments or groups within a business or organization may change over time, and so the amount, organization, and allocation of resources may need to be updated periodically. In some embodiments, departments or groups of users may be "charged", e.g., against internal financial or resource accounts or budgets for those departments or groups. In some embodiments, the systems described herein may also include one or more "management" computing systems, e.g., management blades, which may be used to monitor and/or manage the plurality of computing systems. For example, a management blade may mediate or facilitate the organization and allocation of computer resources, and may also track resource usage and provide logging, analysis, and possibly accounting functionality for the system, e.g., for assessing charges for the resource usage. In various embodiments, the management computing system(s) may be accessed and controlled by a remote human interface system 230, as described herein, and/or via a human interface system located proximate to the blade installation.

Embodiments of the methods described above with reference to FIGS. 6-7B describe exemplary operation of the system of FIG. 8, where the transmission medium is the LAN or WAN 840.

Note that while use of a LAN may be suitable for provision of computer resources to users within a single building, campus, or business, the use of a WAN, such as the Internet, may facilitate provision of computer resources to various entities, e.g., business or organizations, over large geographic areas, including, for example, entities located overseas from the host facility, and/or international entities or enterprises with branches/users distributed worldwide.

FIG. 9 is a flowchart of one embodiment of a method for providing computer resources to users via embodiments of the system of FIG. 8. As noted above, in various embodiments, one or more of the following method elements may be performed concurrently, in a different order than shown, or may be omitted entirely. Other additional method elements may also be performed as desired. Note that some of the method elements of FIG. 9 are substantially the same as or similar to those of FIG. 6, in which case their descriptions may be abbreviated. These method elements have been denoted by appending an "A" to the method element reference number.

As FIG. 9 indicates, in 602A, a plurality of co-located computing systems may be established at a first location. The co-located computing systems are preferably blade computers installed in a cage (or cages), as described above, where the cage is preferably located in a climate controlled "computer room" or computer resource facility owned and operated by a first company or organization (i.e., enterprise) to provide computational resources to other entities, e.g., to other companies, organizations, and/or homes or individuals, on a charge basis.

In 604A, a plurality of remote human interfaces may be established at remote second locations, i.e., remote from the first location. Each of the remote human interfaces may include an interface device and one or more human interface devices, as described above. The remote human interfaces may be used by employees or associates of one or more enterprises that are distinct from the entity that owns and operates the co-located computing systems.

In 606A, the plurality of co-located computing systems (e.g., blades) may be selectively communicatively coupled to the plurality of remote human interfaces via a WAN, such as the Internet. As noted above, any network protocols may be used as desired for communicating over the network, e.g., Ethernet (including wireless), TCP/IP, and so forth, as desired. Other network technologies contemplated include switched fabric networks, e.g., using the Infiniband protocol, among others.

In 608A, the plurality of co-located computing systems and the plurality of remote user interfaces may be operated in conjunction to provide computer resources to users of the remote human interfaces. As noted above, computer resources may refer to hardware, software, or any combination of the two. Additionally, in various embodiments, such resources may be allocated and used serially, in parallel, and/or in an interleaved fashion.

As indicated by the arrow leading from method element 608A to method element 604, in some embodiments, the method may include establishing one or more additional pluralities of remote human interfaces at additional (different) remote second locations, e.g., at remote third locations, and coupling the additional pluralities of remote human interfaces to the plurality of computing systems via the WAN, e.g., the Internet. These additional pluralities of remote human interfaces are preferably for the use of additional entities, e.g., other businesses, organizations, homes, etc. Thus, the computer resources host facility 800 may operate to provide computer resources to numerous businesses, organizations, homes, and so forth, in accordance with the computer resource performance needs of the various users. In other words, establishing the plurality of co-located computing systems, providing the resources, and charging for the resources may be performed by a first entity (e.g., a first business), where the users of the plurality of remote human interface systems work for one or more second entities.

For example, different blades may be dynamically allocated to different users at different times. Thus a first plurality N of blades may effectively provide computational resources for more than N users, e.g., for 2N, 3N, 4N . . . 10N number of users. In other words, it is presumed that one blade will provide computational resources to a plurality of users, possibly concurrently. Thus, for example, different threads of execution associated with different users may be executing on one blade at one time. In a blade that comprises a plurality of processors, each processor may concurrently support one or more users.

In 910, the computer resource usage provided to the various users or groups of users may optionally be monitored. For example, in a preferred embodiment, resource use for a specified period of time may be determined for each entity, e.g., on a monthly basis. The computer resource usage may be based on one or more of CPU cycle time, number of CPU cycles, memory usage, application usage, etc.

Finally, in 912, the users or their representatives, e.g., the various entities, may be charged for the computer resource usage, e.g., by billing to an account, such as a credit account, although other payment means and schemes may be used as desired. The method also preferably includes receiving payment for the charges of 912, e.g., by credit account, credit card, cash, or any other payment method desired.

For example, in embodiments where computer resource usage by the users is monitored, charges for the computer resource usage may be determined based on the monitoring, i.e., based on the computer resources used, and the users or their representatives charged accordingly. As noted above, in some embodiments these charges may be made on a per entity basis, while in other embodiments the charges may be made on a per user basis (or a combination of the two).

In some embodiments, the providing and charging may be performed in accordance with a subscription agreement with the users or their representatives, and/or a metered use agreement with the users or their representatives. For example, agreements that may be negotiated with an entity may include one or more of: flat rate subscriptions, where some nominal amount or rate of computer resource consumption may be paid for (or pre-paid for) on a periodic basis; a "pay as you go", or "on demand" agreement whereby an entity is simply charged for the actual resources used in a specified time period (optionally plus any standard or fixed fees); and a combination agreement, where a standard fee covers a nominal amount or rate of resource use, and where resource usage that exceeds or falls outside the scope of the standard coverage may be monitored and commensurate charges added to the standard fee. However, it should be noted that any other charge assessment methods and means may be used as desired, the above approaches simply being illustrative of the approaches contemplated.

In some embodiments, an entity that desires use of computer resources, i.e., a client entity, may request or perform an audit of its IT processes to determine the general needs of the entity regarding computer resources, and an agreement negotiated based on results of the audit.

As noted above, the computer resources available for provision to users may include hardware resources and software resources, where the resources (or combinations of resources) may have or be associated with a performance level, referred to herein simply as the resource's performance.

For example, the performance of the computer resources may include one or more of: hardware computation capacity, hardware memory capacity, communication bandwidth, software application computational demands, software application cost, and operating system attributes, among others. In some embodiments, various performance metrics may be determined for the different computer resources, e.g., floating point operations per second, megabytes of storage, program complexity or requirements, and so forth.

As noted above, in preferred embodiments, computer resource management, allocation, use, and charging may be made or performed on a task basis, where a task comprises a specified use of one or more computer resources. In other words, rather than considering resource usage on a simple resource basis, a higher-level approach may be used where defined tasks represent or include specified combinations of resources. For example, a large document production task may include use of a particular word processing program, e.g., Adobe Pagemaker™, Corel Wordperfect™, or Microsoft Word™, executing on hardware whose general performance level may be user-specified, e.g., a low- or medium-performance hardware platform, with an upper memory use limit of 200 MB, e.g., for 20 hours. Another task example may include execution of a complex Spice simulation for circuit design on a high-performance platform, e.g., a 3 GHz computer with a GB or RAM and 100 GB of hard disk space, e.g., for 8 hours. Note that some tasks may be compound, e.g., may include various other tasks as subtasks, which may be performed concurrently, serially, or some combination of the two. Note also that in some embodiments, a task may utilize a group of computing systems, e.g., as a cluster, to perform the computational aspects of the task in parallel fashion.

It should also be noted that in some embodiments of the systems and methods presented herein, multiple users may use resources on a single computing system substantially concurrently, e.g., in different execution threads, via time-sharing, and so forth. In other words, as noted above, in some embodiments, the computer resources included in the plurality of computing systems may be considered and used as one or more pools of resources, where a single resource may span multiple computing systems, and/or a single computing system may include multiple resources. As another example, a single computer system may provide multiple users with word processing resources, where instances of the word processing application may be created and used on demand.

To determine the performance of a task, e.g., a group of resources needed to perform a particular task, possibly over a timeline, the performance of the resources may be combined in various ways to produce a total performance level for the group. For example, in one embodiment, the various performances of the resources may be weighted according to their prominence in the task, and a weighted average computed to represent the performance of the task. In another embodiment, the performances of the resources may be considered to be simple rates, e.g., with respect to time, amount, etc. These rates may be multiplied by their respective quantifiers, e.g., time, number, etc., and the products summed to produce a total performance value for the task.

Thus, in some embodiments, the performance of the resources, e.g., of the task, may determine the cost of use for the user/entity.

In some embodiments, auxiliary services may also be provided. In other words, the first entity, i.e., the business or organization providing the resources (or an associated other entity) may also provide services beyond provision of these resources. For example, auxiliary services contemplated include, but are not limited to, task support for a user; development and/or debugging services for a user, network bandwidth, Internet access, phone service, media service, etc. For example, a user may utilize a high-performance program development environment executing on a high-performance computer platform, e.g., to develop an application, and may also request help in developing and/or debugging the application. As another example, if the user has prepared a large document using provided word processing resources, exemplary auxiliary services or task support may include document proof-reading, editing, commercial printing, and so forth. The user may be charged for these services on a per job basis, at a specified rate, and/or as a subscription service, among other charge schemes.

In some embodiment, the method may include providing a graphical user interface (GUI) to one or more users or their representatives, where the GUI presents computer resource provision agreement options. Input to the GUI selecting one or more of the computer resource provision agreement options may be received, where the providing and charging described above may be performed in accordance with the selected computer resource provision agreement options.

Similarly, in some embodiments of the methods presented above, the methods may include providing a graphical user interface (GUI) to one or more users or their representatives. The GUI may be provided over the Internet. The GUI may present available computer resources and/or resource configurations and associated charge amounts. Input to the GUI requesting use of one or more of the computer resources may be received, where the providing and charging are performed in accordance with the requested computer resources. As noted above, in some embodiments, the computer resources may be managed in terms of tasks. Thus, in some embodiments, the GUI may present the available computer resources in terms of tasks, where requesting use of one or more of the computer resources may include requesting performance of at least one task.

The GUI may also display information regarding resources used and/or current charges. Thus and administrator of an organization may be able to view the GUI to assess the current charges to date and other information on resource usage. The GUI may also present a GUI element, such as a slider, which allows the user to "dial up" (i.e., increase) or "dial down" (i.e., decrease) the amount of resources being used, and hence the cost to the organization.

It should be noted that while the establishment of additional human interface systems (for additional entities) are shown in FIG. 9 as occurring prior to the monitoring (910) and charging (912) method elements, it should be noted that these additional human interface systems for additional entities may be added to the system at any time. In other words, it is contemplated that any new customers (users or entities) may be accommodated at any time.

Thus, various embodiments of the above systems and methods may be used to provide computer resources to users based upon their resource performance needs.

Various embodiments further include receiving or storing instructions and/or data implemented in accordance with the foregoing description upon a carrier medium. Suitable carrier media include a memory medium as described above, as well as signals such as electrical, electromagnetic, or digital signals, conveyed via a communication medium such as networks and/or a wireless link.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

We claim:

1. A method for providing computer resources to users, the method comprising:
    establishing a plurality of co-located computing systems at a first location, wherein the plurality of co-located computing systems comprises a hierarchy of computer resources based on performance, and wherein each of the plurality of co-located computing systems lacks a local human interface system, wherein the performance of the computer resources comprises:
        software application cost; and
        software application computational demands;
    establishing a plurality of remote human interface systems at different respective second locations, wherein the second locations are remote from the first location, and wherein the plurality of remote human interface systems are coupled to the plurality of co-located computing systems over a wide area network (WAN);
    providing computer resources of two or more of the co-located computing systems respectively to two or more users of the plurality of remote human interface systems on a one-to-one basis over the WAN in accordance with the computer resource performance needs of the users;
    charging for usage of the computer resources;
    providing a graphical user interface (GUI) to at least one of the two or more users or their representatives, wherein the GUI presents available computer resources, wherein the GUI comprises a slider control, wherein the slider control allows the at least one of the two or more users or their representatives to increase or decrease resources used;
    receiving input to the GUI requesting use of one or more of the computer resources;
    wherein said providing computer resources and said charging for usage are performed in accordance with the requested computer resources;
    providing auxiliary services to a user of the two or more users, wherein the auxiliary services include debugging services for the user, and one or more of:
        document proof-reading;
        editing; or
        commercial printing; and
    charging for the auxiliary services.

2. The method of claim 1, further comprising: receiving payment in response to said charging.

3. The method of claim 1, further comprising:
    monitoring computer resource usage by the users; and
    determining charges for the computer resource usage based on said monitoring;
    wherein said charging comprises charging the determined charges for the computer resource usage.

4. The method of claim 3, wherein said determining charges for the computer resource usage based on said monitoring comprises determining the charges per user.

5. The method of claim 1, wherein said providing and said charging are performed in accordance with one or more of:
    a subscription agreement with the users or their representatives; or
    a metered use agreement with the users or their representatives.

6. The method of claim 1, wherein the computer resources comprise one or more of:
    computational resources; or
    software programs.

7. The method of claim 1, wherein the performance of the computer resources comprises one or more of:
    hardware computation capacity;
    hardware memory capacity;
    communication bandwidth; or
    operating system attributes.

8. The method of claim 1,
    wherein said establishing a plurality of co-located computing systems, said providing, and said charging are performed by a first entity, and wherein the users of the plurality of remote human interface systems work for a second entity.

9. The method of claim 8, further comprising:
    providing auxiliary services to a user, wherein the auxiliary services further include one or more of:
        task support for a user.

10. The method of claim 1, wherein said providing computer resources and said charging for usage of the computer resources are performed on a task basis, wherein a task comprises a specified use of one or more computer resources.

11. The method of claim 1, wherein said plurality of co-located computing systems comprise a plurality of co-located blade computers.

12. The method of claim 1, further comprising:
    establishing an additional plurality of remote human interface systems at different respective third locations, wherein the third locations are remote from the first location, and wherein the additional plurality of remote human interface systems are coupled to the plurality of co-located computing systems over the WAN;
    providing computer resources to users of the additional plurality of remote human interface systems in accordance with the computer resource performance needs of the users; and
    charging for usage of the computer resources.

13. The method of claim 1, further comprising:
    providing a graphical user interface (GUI) to one or more users or their representatives, wherein the GUI presents computer resource provision agreement options; and
    receiving input to the GUI selecting one or more of the computer resource provision agreement options;
    wherein said providing and said charging are performed in accordance with the selected computer resource provision agreement options.

14. The method of claim 1,
    wherein said available computer resources are presented in terms of tasks; and
    wherein said requesting use of one or more of the computer resources comprises requesting performance of at least one task.

15. The method of claim 1,
    wherein said charging is based on the performance of the computer resources used.

16. The method of claim 1, further comprising:
    monitoring computer resource usage by the two or more users; and
    analyzing resource usage based on said monitoring;

29 wherein results of said analyzing are useable in managing the computer resources.

17. The method of claim 1, wherein the remote human interface systems are not capable of general purpose computer functionality.

18. The method of claim 1, wherein the hierarchy of computer resources comprises hardware and/or software with a variety of performance levels.

19. The method of claim 1, wherein each of the plurality of remote human interface systems includes a respective interface device interposed between human interface devices comprised in the remote human interface system and the WAN, wherein the interface device comprises one or more of:
    network logic for interfacing to the WAN; and
    human interface logic for sending and receiving human interface signals to and from the human interface devices.

20. A system for providing computer resources to users, comprising:
    a plurality of computing systems each located at a first location, wherein the plurality of co-located computing systems comprises a hierarchy of computer resources based on performance, wherein the performance of the computer resources comprises one or more of:
        software application cost; and
        software application computational demands;
    wherein each of the plurality of co-located computing systems lacks a local human interface system, and wherein each of the computing systems includes:
        a processor; and
        a memory medium coupled to the processor; and
    a plurality of remote human interface systems at different respective second locations, wherein the second locations are remote from the first location, and wherein the plurality of remote human interface systems are coupled to the plurality of co-located computing systems over a wide area network (WAN);
    wherein the plurality of computing systems includes at least one management computing system, wherein the at least one management computing system stores program instructions that are executable to:
        manage the organization and allocation of computer resources, including provision of computer resources of two or more of the co-located computing systems respectively to two or more users of the plurality of remote human interface systems on a one-to-one basis over the WAN in accordance with the computer resource performance needs of the users, and provision of auxiliary services to a user of the two or more users, wherein the auxiliary services include debugging services for the user, and one or more of:
            document proof-reading;
            editing; or
            commercial printing;
        monitor resource usage and provide logging, analysis, and/or accounting functionality for the system, for assessing charges for usage of the computer resources and the auxiliary services;
        provide a graphical user interface (GUI) to at least one of the two or more users or their representatives, wherein the GUI presents available computer resources, wherein the GUI comprises a slider control, wherein the slider control allows the at least one of the two or more users or their representatives to increase or decrease resources used; and
        receive input to the GUI requesting use of one or more of the computer resources;

30 wherein to provide computer resources and assess charges for usage, the program instructions are executable to provide and assess charges for usage in accordance with the requested computer resources.

21. The system of claim 20, wherein the remote human interface systems are not capable of general purpose computer functionality.

22. The system of claim 20, wherein said plurality of co-located computing systems comprise a plurality of co-located blade computers.

23. The system of claim 20, wherein each of the plurality of remote human interface systems includes a respective interface device interposed between human interface devices comprised in the remote human interface system and the WAN, wherein the interface device comprises one or more of:
    network logic for interfacing to the WAN; and
    human interface logic for sending and receiving human interface signals to and from the human interface devices.

24. A method for providing computer resources to users, the method comprising:
    establishing a plurality of co-located computing systems at a first location, wherein the plurality of co-located computing systems comprises a hierarchy of computer resources based on performance, and wherein each of the plurality of co-located computing systems lacks a local human interface system, wherein the performance of the computer resources comprises one or more of:
        software application cost; and
        software application computational demands;
    establishing a plurality of remote human interface systems at different respective second locations, wherein the second locations are remote from the first location, and wherein the plurality of remote human interface systems are coupled to the plurality of co-located computing systems over a local area network (LAN);
    providing computer resources of two or more of the co-located computing systems respectively to two or more users of the plurality of remote human interface systems on a one-to-one basis in accordance with the computer resource performance needs of the users; and
    providing a graphical user interface (GUI) to at least one of the two or more users or their representatives, wherein the GUI presents available computer resources, wherein the GUI comprises a slider control, wherein the slider control allows the at least one of the two or more users or their representatives to increase or decrease resources used;
    receiving input to the GUI requesting use of one or more of the computer resources;
    wherein said providing computer resources is performed in accordance with the requested computer resources;
    providing auxiliary services to a user of the two or more users, wherein the auxiliary services include development and/or debugging services for the user, and one or more of:
        document proof-reading;
        editing; or
        commercial printing; and
    charging for usage of the computer resources and the auxiliary services.

25. The method of claim 24, further comprising:
    monitoring computer resource usage by the two or more users; and
    analyzing resource usage based on said monitoring;
    wherein results of said analyzing are useable in managing the computer resources.

26. The method of claim 24, wherein the remote human interfaces are not capable of general purpose computer functionality.

27. The method of claim 24, wherein the computer resources comprise one or more of:
 computational resources; or
 software programs.

28. The method of claim 24, wherein the performance of the computer resources comprises one or more of:
 hardware computation capacity;
 hardware memory capacity;
 communication bandwidth; or
 operating system attributes.

29. The method of claim 24,
 wherein said providing computer resources is performed on a task basis, wherein a task comprises a specified use of one or more computer resources.

30. The method of claim 29, wherein the auxiliary services further include:
 task support for the user.

31. The method of claim 24, wherein said plurality of co-located computing systems comprise a plurality of co-located blade computers.

32. The method of claim 24,
 wherein said available computer resources are presented in terms of tasks; and
 wherein said requesting use of one or more of the computer resources comprises requesting performance of at least one task.

33. The method of claim 24, wherein each of the plurality of remote human interface systems includes a respective interface device interposed between human interface devices comprised in the remote human interface system and the LAN, wherein the interface device comprises one or more of:
 network logic for interfacing to the LAN; or
 human interface logic for sending and receiving human interface signals to and from the human interface devices.

34. A system for providing computer resources to users, comprising:
 a plurality of computing systems each located at a first location, wherein the plurality of co-located computing systems comprises a hierarchy of computer resources based on performance, wherein the performance of the computer resources comprises one or more of:
 software application cost; and
 software application computational demands;
 wherein each of the plurality of co-located computing systems lacks a local human interface system and wherein each of the computing systems includes:
 a processor; and
 a memory medium coupled to the processor; and
 a plurality of remote human interface systems at different respective second locations, wherein the second locations are remote from the first location, and wherein the plurality of remote human interface systems are coupled to the plurality of co-located computing systems over a local area network (LAN);
 wherein the plurality of computing systems includes at least one management computing system, wherein the at least one management computing system stores program instructions that are executable to:
 manage the organization and allocation of computer resources, including provision of computer resources of two or more of the co-located computing systems respectively to two or more users of the plurality of remote human interface systems on a one-to-one basis over the LAN in accordance with the computer resource performance needs of the users, and provision of auxiliary services to a user of the two or more users, wherein the auxiliary services include debugging services for the user, and one or more of:
 document proof-reading;
 editing; or
 commercial printing;
 monitor resource usage and provide logging, analysis, and/or accounting functionality for the system, for managing the computer resources;
 provide a graphical user interface (GUI) to at least one of the two or more users or their representatives, wherein the GUI presents available computer resources, wherein the GUI comprises a slider control, wherein the slider control allows the at least one of the two or more users or their representatives to increase or decrease resources used; and
 receive input to the GUI requesting use of one or more of the computer resources;
 wherein said provision of computer resources is in accordance with the requested computer resources; and
 charge for usage of the computer resources and the auxiliary services.

* * * * *